US012326856B2

(12) United States Patent
Mohammed et al.

(10) Patent No.: US 12,326,856 B2
(45) Date of Patent: Jun. 10, 2025

(54) USING GENERATIVE ARTIFICIAL INTELLIGENCE TO IMPROVE USER INTERACTIONS

(71) Applicant: The Toronto-Dominion Bank, Toronto (CA)

(72) Inventors: Shahzad Mohammed, Ontario (CA); Dino Paul D'Agostino, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/498,284

(22) Filed: Oct. 31, 2023

(65) Prior Publication Data

US 2025/0139085 A1 May 1, 2025

(51) Int. Cl.
| | | |
|---|---|---|
| G06F 16/00 | (2019.01) | |
| G06F 9/54 | (2006.01) | |
| G06F 16/242 | (2019.01) | |

(52) U.S. Cl.
CPC ........... *G06F 16/243* (2019.01); *G06F 9/542* (2013.01)

(58) Field of Classification Search
CPC .............................. G06F 9/542; G06F 16/243
See application file for complete search history.

(56) References Cited

U.S. PATENT DOCUMENTS

| | | | |
|---|---|---|---|
| 2021/0109996 A1* | 4/2021 | Yang | .................. G06N 3/08 |
| 2024/0069987 A1* | 2/2024 | Dintenfass | ............ G06F 9/3836 |
| 2024/0070434 A1* | 2/2024 | Garg | ................... G06N 3/0455 |

OTHER PUBLICATIONS

Petr Gazarov, What is an API? In English, please., Dec. 19, 2019, <URL: https://www.freecodecamp.org/news/what-is-an-api-in-english-please-b880a3214a82/> (Year: 2019).*
Difference between AI, ML, LLM, and Generative AI, Aug. 27, 2023, <URL: https://toloka.ai/blog/difference-between-ai-ml-llm-and-generative-ai/> (Year: 2023).*
Non-Final Office Action in U.S. Appl. No. 18/407,852, mailed on Oct. 1, 2024, 18 pages.

* cited by examiner

*Primary Examiner* — Tyler J Torgrimson
(74) *Attorney, Agent, or Firm* — Rowand LLP

(57) ABSTRACT

The present disclosure generally relates to systems, software, and computer-implemented methods for using generative artificial intelligence to improve user interactions. One example method includes receiving a notification from a contact center application that user interaction events have been generated during an interaction session. Event descriptions for events generated in the session are located in a contact center application use case definition. Event descriptions are enhanced with event information for to generate contextualized event information. The contextualized event information to is added to a generative large language model artificial intelligence context that is provided to a generative large language model artificial intelligence engine. A query is provided to the generative large language model artificial intelligence engine. A query response is received from the generative large language model artificial intelligence engine and the query response is used in the interaction session.

20 Claims, 20 Drawing Sheets

302 — CALL_ROUTE_REQ $VT callid 10, 1457930B7A dialed_number 12, EB_TB_TDA_E_010
304 — ani 10, 5161234567
306 — callvar1 40, Jane Doe
callvar2 40, 4163079235Jane Doe
callvar3 40, 58929700000000000753          P
callvar4 40, Aetna Tower, 14 floor
callvar5 40, Toronto          ONM5K1A2          TB001M$BSLA
callvar6 40, 000000000000000012345678Jean Sebastien G
callvar7 40, 000000000000000022345678iguerre
callvar8 40, 0767400045200160000001262
callvar9 40, 000000000000000042345678TDAECOMAINMN
callvar10 40
ced   10, 8001234567

FIG. 3

Header Information Added to Process Template  *1100*

1102 — "TemplateID": "e4a70c4b-deda-44b2-9399-53bd9a73821b",
1104 — "TemplateVersion": "1.0.0",
1106 — "TemplateModifiedDate": "2023-08-12T23:56:02Z",
1108 — "TemplateModifiedCreationDate": "2023-09-10T19:30:04Z",
1110 — "InteractionID": "97a2aa8e-45e8-11ee-be56-0242ac120002",
1112 — "BuilderID": "9dc2fff4-45e8-11ee-be56-0242ac120002",
1114 — "CustomerID": "f08e233f-c8a8-4db7-8c36-038410e39732",
1116 — "LOBID": "102",
1118 — "LocationInfo": "CA-ON",
1120 — "Language": "US-en",
1122 — "DateTime": "2023-01-15T10:45:49Z",
1124 — "ChannelID": "Telephone",
1126 — "MediaID": "Voice",
1128 — "SessionInfo": "a6613c9a-3c7c-4ece-a50b-3221a5dcf2cc",
1130 — "DeviceInfo": "PSTN",
1132 — "InteractionHandle": "4161231234",
1134 — "InteractionLastUpdated": "2023-09-10T19:40:04Z",

FIG. 11

```
"Insights" : {
"TextAnalysis": [
    {                   ⌐1402
        "name": "Heading",    ⌐1403
        "connection": "60001",   ⌐1404
        "input": "$ContextPrompt",
        "description": "Generates a heading for the ContextPrompt.",   ⌐1406
        "prompt": "Generate a heading to summarize the interaction from a customer's perspective.",
        "completionParamsProfile": "70001"
    },
    {              ⌐1414   ⌐1408
        "name": "Greeting",
        "connection": "60001",
        "input": "$ContextPrompt",
        "description": "Generates a customer greeting for the CSR based on wait time and customer information if available for the
                    ContextPrompt.",
        "prompt": "Generate a greeting a CSR can use to greet the customer. If customer and CSR names are available use those in the
                    greeting. Also if customer had to wait for an above average time consider that in your greeting.",
        "completionParamsProfile": "70001"
    },                                                                                              ⌐1416
    {              ⌐1418
        "name": "Sentiments",
        "connection": "60001",
        "input": "$ContextPrompt",
        "description": "Detect sentiments in the text for the ContextPrompt.",
        "prompt": "Generate a sentiment analysis report from the interaction from a customer, CSR and overall interaction perspective.
                    Highlight key points in the interaction where sentiments were changed. Highlight following sentiments: Positive, Neutral,
                    Negative, Frustrated, Appreciative.",
        "completionParamsProfile": "70001"                                                          ⌐1420
    },
    {              ⌐1422
        "name": "Summary",
        "connection": "60001",
        "input": "$ContextPrompt",
        "description": "Generate a summary of text in the ContextPrompt",   ⌐1424
        "prompt": "Generate a summary of the interaction of about 300 words or less. ",
        "functionCalling": "99903, 99904",
        "completionParamsProfile": "70001"
    }
]
},           ⌐1412
"CompletionProfiles": {
    "Profiles": [
        {       ⌐1410
            "ID": "70001",
            "temperature": 0.7,
            "max_tokens": 1024,
            "top_p": 1,
            "frequency_penalty": 0,
            "presence_penalty": 0
        },
}
```

FIG. 14 *1400*

USING GENERATIVE ARTIFICIAL INTELLIGENCE TO IMPROVE USER INTERACTIONS

TECHNICAL FIELD

The present disclosure generally relates to data processing techniques and provided computer-implemented methods, software, and systems for using generative artificial intelligence to improve user interactions.

BACKGROUND

A user may interact with a system in different ways. For example, the user can access a system provided by an organization from a number of different channels, such as by using a mobile application, a web site, or a chat bot provided by the organization, by sending a text message or making a telephone call to a phone number associated with the organization, or by sending an email message to the organization. During interactions the user may perform using one of these channels, the user may be initially unauthorized to access the system and then later may be authorized to the system. Additionally, some interactions performed by the user using the channels may be considered unassisted interactions (e.g., without assistance by an agent of the organization), whereas other interactions may be considered assisted interactions (e.g., with assistance from an agent).

SUMMARY

The present disclosure generally relates to systems, software, and computer-implemented methods for using generative artificial intelligence to improve user interactions.

A first example method includes: receiving a notification from a contact center application that user interaction events have been generated during an interaction session of a user with the contact center application; retrieving, from an events store and in response to the notification, event information for generated events that have been generated for the interaction session that have an interaction identifier matching an interaction identifier associated with the interaction session; obtaining a contact center application use case definition that includes event descriptions of events that can occur during user interactions with the contact center application during the use case; locating, in the contact center application use case definition, event descriptions for generated events that are included in the event information; enhancing located event descriptions with event information for corresponding generated events to generate contextualized event information; adding contextualized event information to a generative large language model (LLM) artificial intelligence (AI) context for a generative LLM AI engine; and providing the generative LLM AI context and a query to the generative LLM AI engine for the generative LLM AI engine to provide assistance in the interaction session by answering the query; receiving a query response from the generative LLM AI engine; and using the query response in the interaction session.

Implementations can optionally include one or more of the following features. The notification can indicate a start of an agent-assisted interaction leg of the interaction session. The generative LLM AI engine can use the generative AI context to assist a contact center agent in the assisted interaction leg of the interaction session. The contact center application use case definition can include application programming interface (API) information for APIs that can be invoked to generate further contextual information to include in the generative AI context. A first API definition for a first API that has a same event identifier as a first generated event can be located in the contact center application use case definition. The first API can be invoked and API output can be received from the first API. The API output can be included in the generative LLM AI context. Invoking the first API can include providing event information for the first generated event to the first API. The contact center application use case definition can include plug-in information for at least one generative LLM AI model plug-in. The plug-in information can be included in the generative LLM AI context to instruct the generative LLM AI engine to enable the at least one generative LLM AI model plug-in during the interaction session. Enhancing located event descriptions with event information can include, for a first generated event and a first event description, determining that the first event description includes an event data placeholder that comprises an event data key. A key-value pair that has a key matching the event data key in the event data placeholder can be located in the first generated event. A value corresponding to the key in the key-value pair can be extracted. In the first event description, the event data placeholder can be replaced with the value corresponding to the key. The contact center application can be a voice response system, a chat application, a mobile application, or a web application. The contextualized event information can be provided to the generative LLM AI engine along with an insight prompt that prompts the generative LLM AI engine to generate an insight from the contextualized event information. The generated insight can be received from the generative LLM AI engine and added to generative LLM AI context. The insight can indicate whether the contextualized event information adheres to one or more organizational policies. The insight can indicate whether the contextualized event information indicates fraud has occurred in the interaction session. The insight can be a human-readable greeting that can be spoken by a contact center agent to the user as a summary of the interaction session. Keywords can be generated from the contextualized event information and provided in a request to at least one data source for keyword-based resources. At least one keyword-based resource can be received from a data source. The keyword-based resource provides information related to at least one generated keyword. Information from or a link to the at least one keyword-based resource can be included in the generative LLM AI context. Before receiving the notification, an indication can be received from the contact center application that the interaction session has begun. The indication can include an identifier of the contact center application use case. In response to the indication, an interaction identifier can be generated for the interaction session of the user with the contact center application. The interaction identifier can be provided to the contact center application in response to the indication.

Similar operations and processes associated with each example system can be performed in different systems comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations can also be contemplated. Additionally, similar operations can be associated with or provided as computer-implemented software embodied on tangible, non-transitory media that processes and transforms the respective data, some or all of the aspects can be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

The techniques described herein can be implemented to achieve the following advantages. First, contact center agents can be provided with relevant information for user assistance, such as a generative artificial intelligence generated summary of current and prior user interactions and a customized personalized greeting. Second, agents can expend less effort and less computing resources can be used assisting users because the agent can be provided with useful summaries of past interactions and therefore does not need to spend time or use computing resources to search for or generate such information. Third, event information during user interactions from legacy or other applications that has insufficient context information can be enriched with semantic context information for building a context for a generative artificial intelligence engine that can be used to assist the user interaction. Fourth, personalized and contextualized responses can be provided to an agent or to a user by a generative artificial intelligence engine during a user service session. Fifth, interaction history for a user can be maintained across service interaction legs such as self-serve, wait, assisted, and post-assisted. Sixth, an agent can use a generative artificial intelligence engine to problem solve issues for a user during a user service session. Seventh, relevant knowledge base articles and references and product and promotion information can be automatically retrieved and included in a generative artificial intelligence context. Eighth, a context of a generative artificial intelligence engine being used to assist a user interaction can be dynamically updated as events and authentication status changes and as a user transitions to different types of interaction legs. Ninth, by providing the agent with relevant information for the current and prior interactions of the user, users can avoid having to repeat information they have previously provided, thereby savings resources that may have otherwise been expended handling repeat interactions.

DESCRIPTION OF DRAWINGS

FIG. 3 illustrates example event information.

FIG. 11 illustrates an example header section of a card template.

FIG. 14 illustrates an example insights section of a card template.

DETAILED DESCRIPTION

Figure 1:
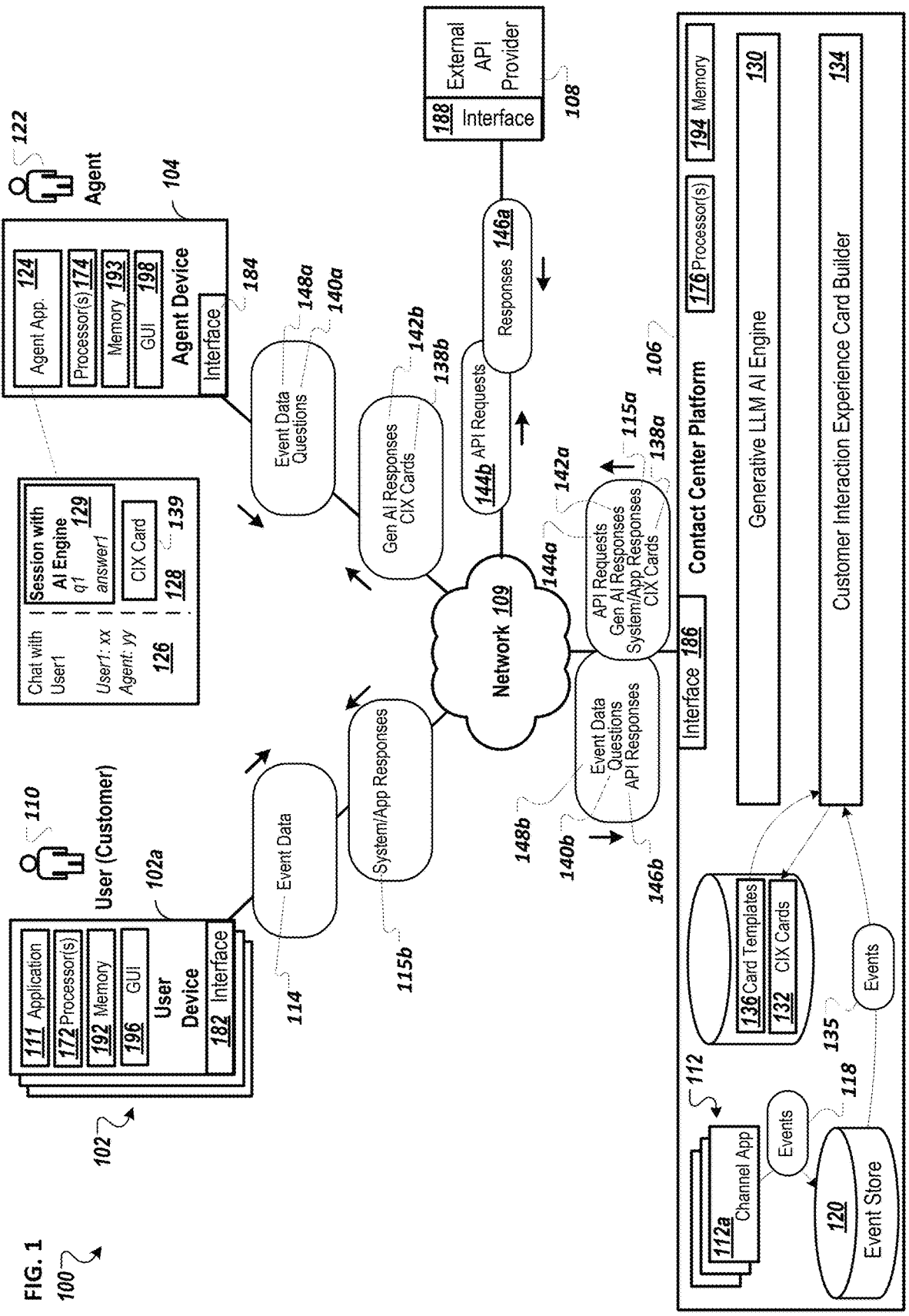
FIG. 1 is a block diagram of a networked environment for using generative artificial intelligence to improve user interactions.

The present disclosure generally relates to using generative artificial intelligence to improve user interactions.

A user may contact a contact center of an organization using various means, such as with voice phone calls, interactive voice response systems, email messages, chat sessions, and various types of web, mobile, or native user device applications. Additionally, a user may contact the organization multiple times regarding a same issue. A contact center agent may not be aware of past user interactions with the organization regarding the issue or even certain recent events that have occurred before the user was connected to the agent. Accordingly, the agent may initially respond to the user with limited information, may ask the user to repeat information the user has already provided using different applications and/or to different agents, etc. Accordingly, resources are wasted in repeat transfer and/or inefficient processing of information regarding the user's interactions with the system.

The organization may employ a generative large language model (LLM) artificial intelligence (AI) system to help contact center agents assist users. However, the contact center may have systems (e.g., legacy systems) that gather raw, cryptic coded event information that may not have semantic meaning and may therefore not prove useful in grounding a generative LLM AI model or engine with information regarding a current state and/or recent activity of a user's interaction with the organization. As described in more detail below, a contact center platform can create contextualized event data and other contextual data that can be provided to the generative LLM AI engine so that the generative LLM AI engine can provide a meaningful benefit regarding improving user interactions with the organization. Other contextual data other than enriched event data can include relevant knowledge base articles and references and product and promotion information.

Accordingly, contact center agents can be provided with relevant information for user assistance, such as a generative artificial intelligence generated summary of current and prior user interactions and a customized personalized greeting. As a result, an agent can expend less effort and less computing resources can be used assisting users because the agent can be provided with useful summaries of past interactions and therefore does not need to spend time or use computing resources to search for or generate such information. By providing the agent with relevant information for the current and prior interactions of the user, users can avoid having to repeat information they have previously provided. Additionally, a context of the generative LLM AI engine being used to assist a user interaction can be dynamically updated as events and authentication status changes and as a user transitions to different types of interaction legs (e.g., self-serve, assisted, etc., as described below). Other details, benefits, and advantages are discussed below with respect to FIGS. 1-17.

Turning to the illustrated example implementation, FIG. 1 is a block diagram of a networked environment 100 for using generative artificial intelligence to improve user interactions. As shown in FIG. 1, the example environment 100 includes user devices 102, an agent device 104, a contact center platform 106, external API providers 108, and a network 109. The function and operation of each of these components is described below.

A user 110 uses one or more user devices 102 (e.g., a user device 102a) to interact with the contact center platform 106. The user devices 102 can include mobile devices, desktop computing devices, or telephones, to name a few examples. Some user devices 102 can include a client application (e.g., a client application 111) that can interact with a corresponding channel application 112 (e.g., server-side application) in the contact center platform 106. For example, the client application 111 may be a mobile application and a channel application 112a may be a server-side application that serves the mobile application (and possibly web applications, etc.). Other channel applications 112 can serve telephone requests, chat sessions, etc.).

The user device 102a can send event data 114 to the contact center platform 106 relating to various types of events that can occur in the client application 111 for an interaction session of the user with the contact center platform 106. The contact center platform 106 can send various system or application responses 115a in response to the event data 114, during the interaction session, which can be received by the user devices 102 as system/application responses 115b. An interaction session, which is referred to herein as an interaction, corresponds to a user's engagement with the contact center platform 106 during one interaction session with a given user device 102.

The event data 114 can correspond to inputs and selections by the user 110 in the client application 111 or in general with the user device 102a. For instance, the event data 114 can include or correspond to user interface selections, voice menu selections, entered text, spoken voice data, or other types of event data. The event data 114 can be received by the contact center platform 106 as event data 116. The event data 116 may generally be received at the contact center platform 106 by corresponding channel applications 112, for example. The respective channel applications 112 can stream event data 118 for received events to an event store 120. Event generation and event streaming are described in more detail below with respect to FIGS. 2, 4A, 4B and 6.

Initial event data from the user device 102a can be associated with a self-serve interaction leg of an interaction. A self-serve interaction leg can be a portion of an interaction that does not involve an agent (e.g., an agent 122) of the contact center platform 106. An assisted leg of the interaction can correspond to a portion of the interaction in which an agent (e.g., the agent 122) does assist the user 110. Interaction legs and interaction leg transitions are described in more detail below with respect to FIG. 2.

The agent 122 can use the agent device 104 during the assisted leg interaction. The agent device 104 can include an agent application 124, for example, that can have a user interface portion 126 that can include a transcript (e.g., chat transcript, voice transcript) of current interactions of the agent 122 with the user 110. The agent application 124 can also include a user interface portion 128 that relates to an interactive AI session 129 between the agent 122 and a generative LLM AI engine 130 included in or accessible by the contact center platform 106.

The interactive AI session can be guided by CIX (Customer Interaction eXperience) cards 132 that are generated by a CIX card builder 134. The CIX cards 132 can provide context to the generative LLM AI engine 130 to enable the generative LLM AI engine 130 to better assist the agent 122 with the assisted interaction leg with the user 110. For example, the event data 114 may be cryptic and include, for example, codes that may not have semantic meaning for the generative LLM AI engine 130. The CIX card builder 134 can, for example, include, in the CIX cards 132, enriched event data.

The enriched event data can include event data 135 from the event store 120 that has been enriched with context from information in card templates 136. The card templates 136 can represent application use cases for different applications that interact with the contact center platform 106. Each card template in the card templates 136 can include event structure definitions that describe structures and descriptions of events that can occur in a given application use case. The event structure definitions can include placeholders meant to represent types of event data that may be generated during an event. The CIX card builder 134 can merge the event data 135 from the event store 120 with the event structure definitions in the card templates 136, to create enriched event data in the CIX cards 132. The event descriptions in the card templates 136 can be engineered to provide semantic context for generated events to the generative LLM AI engine 130. Accordingly, the generative LLM AI engine 130 can be grounded with semantic context, and can thereby provide meaningful answers to the agent 122 during an assisted interaction leg, for example.

For example, the contact center platform 106 can provide CIX cards 138a to the agent device 104, which can be received by the agent device 104 as CIX cards 138b. For example, the contact center platform 106 can provide CIX card(s) 138a that relate to the user 110 when an assisted interaction leg starts for the user 110. The agent application 124 can provide information (e.g., a context prompt) from the CIX cards 138b to an instance of the generative LLM AI engine 130 serving the interactive AI session 129, to ground the generative LLM AI engine 130 for the interactive AI session 129. Although the generative LLM AI engine 130 is displayed as being included in the contact center platform 106, in some implementations, the generative LLM AI engine 130 resides in its own server or system or may be installed locally on the agent device 104.

The agent application 124 can, in some implementations, display some or all of the information in the CIX cards 138b in the agent application 124 (e.g., as shown by CIX card information 139). Additionally, the agent 122 can enter one or more questions in the user interface portion 128 used for the interactive AI session 129. The agent device 104 can send corresponding questions 140a to the generative LLM AI engine 130, which can be received as questions 140b. The generative LLM AI engine 130 can produce generative AI responses to the questions 140b, while grounded from the context included in the CIX cards 138b. The generative LLM AI engine 130 can respond to the questions 140b by sending generative AI responses 142a to the agent application 124, which can be received by the agent application 124 as generative AI responses 142b. The agent application 124 can display the generative AI responses 142b in the user interface portion 128 during the interactive AI session 129. Accordingly, the agent 122 can use output from the generative LLM AI engine 130 during the assisted leg of the interaction.

The CIX card builder 134 can include other types of enriched data in the CIX cards 132. For example, the card templates 136 can include API references for APIs (e.g., provided by the external API provider 108 or by the contact center platform 106 itself). The CIX card builder 134 can send API requests 144*a* to the external API provider 108, for example, which can be received by the external API provider 108 as API requests 144*b*. The external API provider 108 can execute the requested APIs and provide API responses 146*a* to the contact center platform 106, which can be received as API responses 146*b*. The CIX card builder 134 can include the API responses 146*b* in the CIX cards 132, potentially merged with event data 135.

The CIX cards 132 can also be dynamically updated as the interaction progresses. For instance, the agent device 104 can send event data 148*a* representing events in the agent application 124 during the assisted leg of the interaction to the contact center platform 106. The event data 148*a* can be received as event data 148*b*, and can be stored in the event store 120. The CIX card builder 134 can use the event data 148*a* to update the CIX cards 132. Various other details and options for the CIX card builder 134, the CIX cards 132, the card templates 136, and other aspects of the environment 100 are described in more detail below with respect to FIGS. 2-17.

As used in the present disclosure, the term "computer" is intended to encompass any suitable processing device. For example, the user devices 102, agent device 104, the contact center platform 106, and the external API provider 108 can be any computer or processing devices such as, for example, a blade server, general-purpose personal computer (PC), Mac®, workstation, UNIX-based workstation, or any other suitable device. The present disclosure can include computers other than general-purpose computers, as well as computers without conventional operating systems.

The user device 102*a* can be any system that can request data and/or interact with the contact center platform 106. The user device 102*a* in some instances, can be a desktop system, a client terminal, or any other suitable device, including a mobile device, such as a smartphone, tablet, smartwatch, or any other mobile computing device. In general, each illustrated component can be adapted to execute any suitable operating system, including Linux, UNIX, Windows, Mac OS®, Java™, Android™, Windows Phone OS, or iOS™, among others. The user device 102*a* can include, as discussed, the client application 111 and one or more web browsers or web applications that can interact with particular applications executing remotely from the user device 102*a*.

As illustrated, the user device 102*a*, the agent device 104, and the contact center platform 106 respectively include processor(s) 172, 174, or 176. In some cases, multiple processors can be used according to particular needs, desires, or particular implementations of a respective device included in the environment 100. Each processor of the processor(s) 172, 174, and 176 can be a central processing unit (CPU), an application specific integrated circuit (ASIC), a field-programmable gate array (FPGA), or another suitable component. Generally, each processor of the processor(s) 172, 174, and 176 executes instructions and manipulates data to perform the operations of the respective corresponding computing device. Specifically, the processor(s) 172, 174, and 176 can execute the algorithms and operations described in the illustrated figures, as well as the various software modules and functionality described herein. Each processor of the processor(s) 172, 174, and 176 can have a single or multiple cores, with each core available to host and execute an individual processing thread. Further, the number of, types of, and particular processors used to execute the operations described herein can be dynamically determined based on a number of requests, interactions, and operations associated with the environment 100.

Interface 182, 184, 186, and 188 of the user device 102*a*, the agent device 104, the contact center platform 106, and the external API provider 108 can be used for communicating with other systems in a distributed environment—including within the environment 100—connected to the network 109. Generally, each interface 182, 184, 186, and 188 comprises logic encoded in software and/or hardware in a suitable combination and operable to communicate with the network 109 and other components. More specifically, each interface 182, 184, 186, and 188 can comprise software supporting one or more communication protocols associated with communications such that the network 109 and/or interface's hardware is operable to communicate physical signals within and outside of the illustrated environment 100. Still further, each interface 182, 184, 186, and 188 can allow the user device 102, the agent device 104, the contact center platform 106, or the external API provider 108, respectively, and/or other portions illustrated within the environment 100 to perform the operations described herein.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component can be fully or partially written or described in any appropriate computer language including, e.g., C, C++, JavaScript, Java™, Visual Basic, assembler, Perl®, any suitable version of 4GL, as well as others.

As illustrated, the user device 102*a*, the agent device 104, and the contact center platform 106 respectively include memory 192, 192, or 194. Each memory 192, 193, and 194 can represent a single memory or multiple memories. Each memory 192, 193, and 194 can include any memory or database module and can take the form of volatile or non-volatile memory including, without limitation, magnetic media, optical media, random access memory (RAM), read-only memory (ROM), removable media, or any other suitable local or remote memory component. Each memory 192, 193, and 194 can store various objects or data associated with the respective corresponding computing device, including any parameters, variables, algorithms, instructions, rules, constraints, or references thereto.

Network 109 facilitates wireless or wireline communications between the components of the environment 100, as well as with any other local or remote computers, such as additional mobile devices, clients, servers, or other devices communicably coupled to network 109, including those not illustrated in FIG. 1. In the illustrated environment, the network 109 is depicted as a single network, but can be comprised of more than one network without departing from the scope of this disclosure, so long as at least a portion of the network 109 can facilitate communications between senders and recipients. In some instances, one or more of the illustrated components can be included within or deployed to network 109 or a portion thereof as one or more cloud-based services or operations. The network 109 can be all or a portion of an enterprise or secured network, while in another instance, at least a portion of the network 109 can represent a connection to the Internet. In some instances, a portion of the network 109 can be a virtual private network (VPN). Further, all or a portion of the network 109 can comprise either a wireline or wireless link. Example wireless links can include 802.11a/b/g/n/ac, 802.20, WiMax, LTE, and/or any other appropriate wireless link. In other words, the network 109 encompasses any internal or external network, networks, sub-network, or combination thereof operable to facilitate communications between various computing components inside and outside the illustrated environment 100. The network 109 can communicate, for example, Internet Protocol (IP) packets, Frame Relay frames, Asynchronous Transfer Mode (ATM) cells, voice, video, data, and other suitable information between network addresses. The network 109 can also include one or more local area networks (LANs), radio access networks (RANs), metropolitan area networks (MANs), wide area networks (WANs), all or a portion of the Internet, and/or any other communication system or systems at one or more locations.

As illustrated, one or more user devices 102 can be present in the example environment 100. Each user device 102 can be associated with a particular user (e.g., a user who may acquire an item via interactions with the user device 102), or can be associated with/accessed by multiple users, where a particular user is associated with a current session or interaction at the user device 102. The user device 102a can be a user device at which the user 110 is linked or associated.

The illustrated user device 102a and the agent device 104 are each intended to encompass any computing device, such as a desktop computer, laptop/notebook computer, mobile device, smartphone, personal data assistant (PDA), tablet computing device, one or more processors within these devices, or any other suitable processing device. In general, the user device 102a and the agent device 104 and their components can be adapted to execute any operating system. In some instances, the user device 102a and/or the agent device 104 can be a computer that includes an input device, such as a keypad, touch screen, or other device(s) that can interact with one or more client applications, such as one or more mobile applications, including for example a web browser, a banking application, or other suitable applications, and an output device that conveys information associated with the operation of the applications and their application windows to the user of the user device 102a or agent device 104, respectively. Such information can include digital data, visual information, or a GUI (Graphical User Interface) 196 (as shown with respect to the user device 102a) or GUI 198 (as shown with respect to the agent device 104). Specifically, the user device 102a and the agent device 104 can each be any computing device operable to communicate with other components via network 109, as well as with the network 109 itself, using a wireline or wireless connection. In general, the user device 102a and the agent device 104 each comprise an electronic computer device operable to receive, transmit, process, and store any appropriate data associated with the environment 100 of FIG. 1.

The client application 111 executing on the user device 102a can be or include any suitable application, program, mobile app, or other component. The client application 111 can interact with the contact center platform 106, other client(s), or portions thereof, via network 109. In some instances, the client application 111 can be a web browser, where the functionality of the client application 111 can be realized using a web application or website that the user can access and interact with via the client application 111. In other instances, the client application 111 can be a remote agent, component, or client-side version of a corresponding server application provided by the contact center platform 106. In some instances, the client application 111 can interact directly or indirectly (e.g., via a proxy server or device) with the contact center platform 106, or portions thereof.

The GUI 196 of the user device 102a and the GUI 198 of the agent device 104 interface with at least a portion of the environment 100 for any suitable purpose, including generating a visual representation of the client application 111 or the agent application 124, respectively, and/or a web browser, for example. The GUI 196 and the GUI 198 can each also be used to view and interact with various web pages, applications, and web services located local or external to the user device 102a or agent device 104, respectively. Generally, the GUI 196 and the GUI 198 provide a respective user with an efficient and user-friendly presentation of data provided by or communicated within the system. The GUI 196 and the GUI 198 can each comprise a plurality of customizable frames or views having interactive fields, pull-down lists, and buttons operated by the user. In general, the GUI 196 and the GUI 198 are often configurable, support a combination of tables and graphs (bar, line, pie, status dials, etc.), and are able to build real-time portals, application windows, and presentations. Therefore, the GUI 196 and the GUI 198 each contemplate any suitable graphical user interface, such as a combination of a generic web browser, a web-enable application, intelligent engine, and command line interface (CLI) that processes information in the platform and efficiently presents the results to a user visually.

While portions of the elements illustrated in FIG. 1 are shown as individual components that implement the various features and functionality through various objects, methods, or other processes, the software can instead include a number of sub-modules, third-party services, components, libraries, and such, as appropriate. Conversely, the features and functionality of various components can be combined into single components as appropriate.

Figure 2:
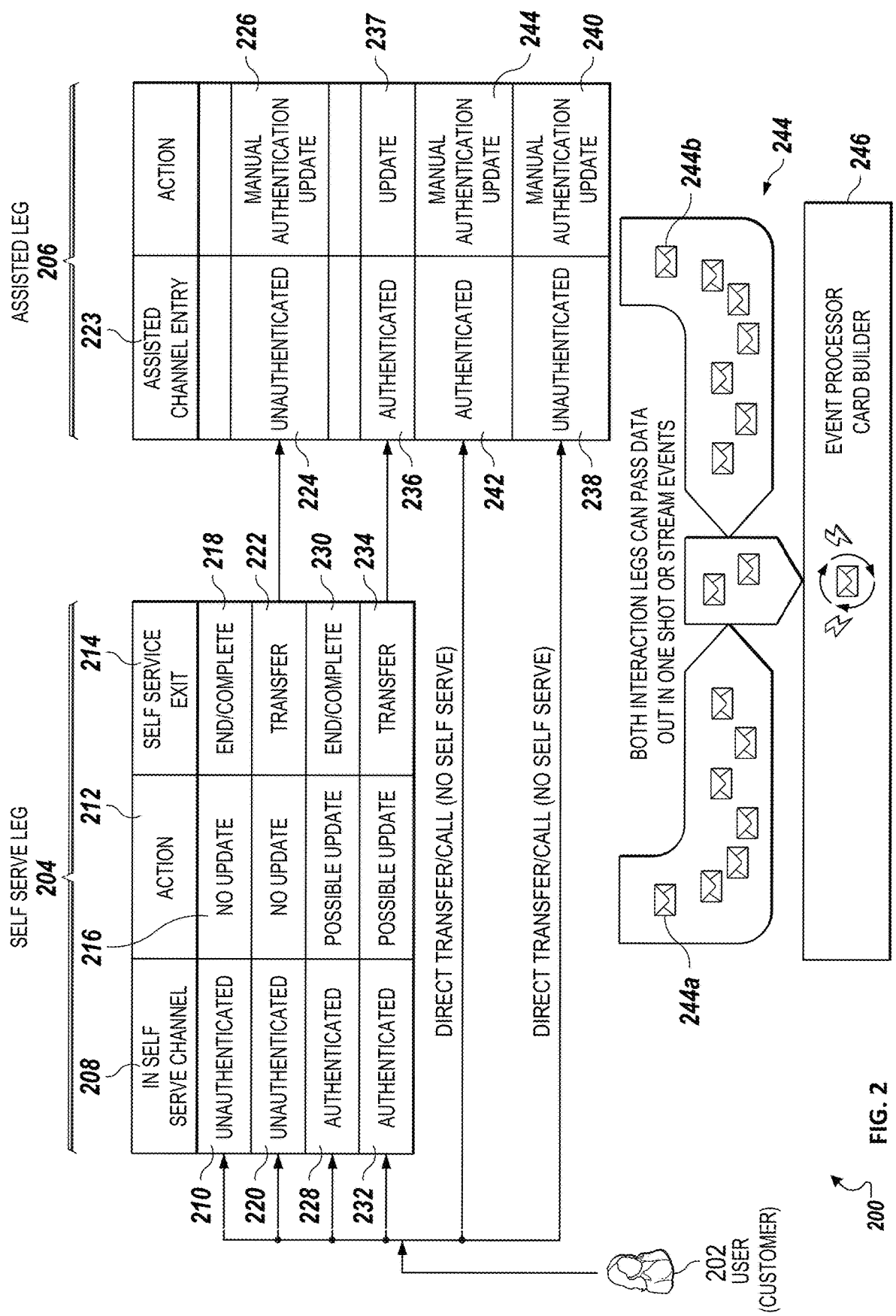
FIG. 2 is a block diagram of an example system for event streaming for unassisted and assisted interaction legs.

FIG. 2 is a block diagram of an example system 200 for event streaming for unassisted and assisted interaction legs. A user 202 can interact with a system in a self-serve (e.g., unassisted) interaction leg 204 and/or an assisted interaction leg 206. The self-serve interaction leg 204 represents interactions of the user 202 without assistance of an agent and the assisted interaction leg 206 represents interactions of the user 202 while being assisted by an agent. The user 202 can have different authentication states 208 while in the self-serve interaction leg 204. For example, the user 202 can start in an unauthenticated state 210 in the self-serve interaction leg 204. The unauthenticated state 210 can be a state in which the user has contacted the system but has not yet been authenticated to the system. Different actions 212 with respect to authentication state can occur for the user 202 while in the self-serve interaction leg 204. Additionally, a given action may result in different types of self-serve exit conditions 214 (e.g., resulting in an end of the self-serve interaction leg 204 for the user 202).

For example, no update may occur regarding the unauthenticated state 210 (e.g., shown as a "no-update 216) during the self-serve interaction leg 204. The user 202 may only perform self-serve activities and may then leave or close the application channel, for example, resulting in an end/complete exit condition 218. As another example, while the user 202 is in an unauthorized state 220 in the self-serve interaction leg 204, the user 202 may request a transfer to an agent (e.g., by selecting an option in an IVR system or by selecting a user interface control in application, etc.). A self-serve exit condition can be a transfer 222 to the assisted interaction leg 206 in this example. The user 202 can, after the transfer, enter the assisted interaction leg 206 with an assisted channel entry authentication state 223 of unauthenticated 224. The agent and the user 202 can participate in a manual authentication update process 226 in which the user 202 provides authorization information and the agent confirms the authorization information. For example, the user 202 can provide, e.g., as voice inputs during a phone call or as text inputs, such as in a chat session, user identifying information. The agent can verify that the user-provided identifying information matches user identifying information stored in a database at the system.

As another example, the user 202 may perform certain actions (e.g., logging in to the system) while in the self-serve interaction leg 204. In response to a successful login, the user 202 can have an authenticated state 228 in the self-serve interaction leg 204 in which the user has been authenticated to the system. If the user logs out or otherwise ends an interaction session, the self-serve interaction leg 204 can end (e.g., with a self-serve exit condition of end/complete 230). As yet another example, while the user 202 is in an authenticated state 232 in the self-serve interaction leg 204, the user 202 may request a transfer to an agent. A self-serve exit condition can be a transfer 234 to the assisted interaction leg 206 in this example. The user 202 can arrive in the assisted interaction leg 206 in an authenticated state 236 (although, in some cases, the agent can reauthorize the user by confirming certain authorization information, as represented by an update action 237).

In some cases, the user 202 is taken directly to the assisted interaction leg 206. For example, the user 202 may direct dial a support number that directly connects to an agent. In this example, the user 202 may enter the assisted interaction leg 206 in an unauthenticated state 238. The agent and the user 202 can participate in a manual authentication update process 240 in which the user 202 provides authorization information and the agent confirms the authorization information. As another example, the user 202 may enter a second assisted interaction leg 206 as a result of a direct transfer that occurs in a first assisted interaction leg 206. For example, the user 202 may be working with a first agent, and the first agent may decide to transfer the user 202 to a second agent. Therefore, the user 202 may enter the second assisted interaction leg 206 in an authenticated state 242. In some cases, the second agent and the user participate in a manual authentication update process 243 in which the user 202 provides authorization information and the second agent confirms the authorization information.

During both the self-serve interaction leg 204 and the assisted interaction leg 206, events 244 (e.g., events 244a and 244b, among others) can be generated. The events 244 can be sent as event messages, for example, as single events, or as events that are bundled/batched by a channel application as an event stream. Each event message can include a unique interaction identifier that allows grouping of multiple event messages belonging to a same interaction. If multiple events are sent in a batch, events can have ordered message identifiers that indicate an order of occurrence of events in the batch. An event message can include an indication of whether the event applies to the self-serve interaction leg 204, the assisted interaction leg 206, or another type of interaction. Other types of interactions can include events that occur after an assisted leg or events that occur during a hold or wait state, for example. For instance, the user 202 may hear, as wait music before being connected to the system on a call, a promotional message for a particular product. The playing of the promotional message can be represented in an event payload of an event for a wait/hold interaction.

In general, event payloads can include information that describes the event that occurred in an interaction. Event payloads can be collections of key-value pairs. Example event information is displayed in FIG. 3.

FIG. 3 illustrates example event information 300. The event information 300 is an example of existing (e.g., legacy) event data (e.g., from an existing application channel). The event information 300 can include an event type indicator 302 (e.g., call route request, in this example). The remainder of the event information 300 can include a set of key-value pairs. For example, the event information includes a key-value pair 304 and a key-value pair 306, among other key-value pairs. The number and type of key-value pairs can vary based on an event type. The key-value pair 304 includes a dialed phone number value (e.g., "5161234567") associated with a "ani 10" key. The key-value pair 304 can include a phone number value identified by automatic number identification (ANI), for example. The key-value pair 306 can include a customer name value associated with a "callvar1 40" key.

While the key (e.g., "ani 10") of the key-value pair 304 may have some semantic meaning (e.g., the "ani" portion), the key (e.g., "callvar1 40") of the key-value pair 306 does not have particular semantic meaning. Nor do the keys of the remainder of the key-value pairs in the event information 300. Accordingly, the generally raw event data in the event information 300 may not be of particular use to a generative AI engine as far as assisting an agent with an interaction. Other event information for other event types, including events for other channel applications, may also be or generally include raw event information that does not have any particular meaningful semantic context information that may be useful for a generative AI engine. As described in more detail below with respect to FIGS. 4A-B, the card builder 246 can enrich raw event information with additional descriptive context, based on defined templates, such as semantic descriptions and narrative commentary regarding data in raw key-value pairs.

Referring again to FIG. 2, the events 244 are provided to an event processor of a card builder 246. As described in more detail below with respect to FIGS. 4A-B, the card builder 246 can, based on card templates and the event payloads of the events 244, enrich the events 244 with additional context information. The card builder 246 can include the enriched event information in cards that can be presented to an agent, to assist the agent in the assisted interaction leg 206. The card builder 246 can also provide enriched event information in one or more prompts to a generative AI engine, for obtaining additional information useful for the agent, such as summary information for event data for a current interaction. Additionally, the agent can be provided with an application that can query the generative AI engine with regards to the enriched context information. As described below, historical cards representing prior interactions of the user 202 can also be provided to the generative AI engine, for summarization and/or query purposes.

Figure 4A:
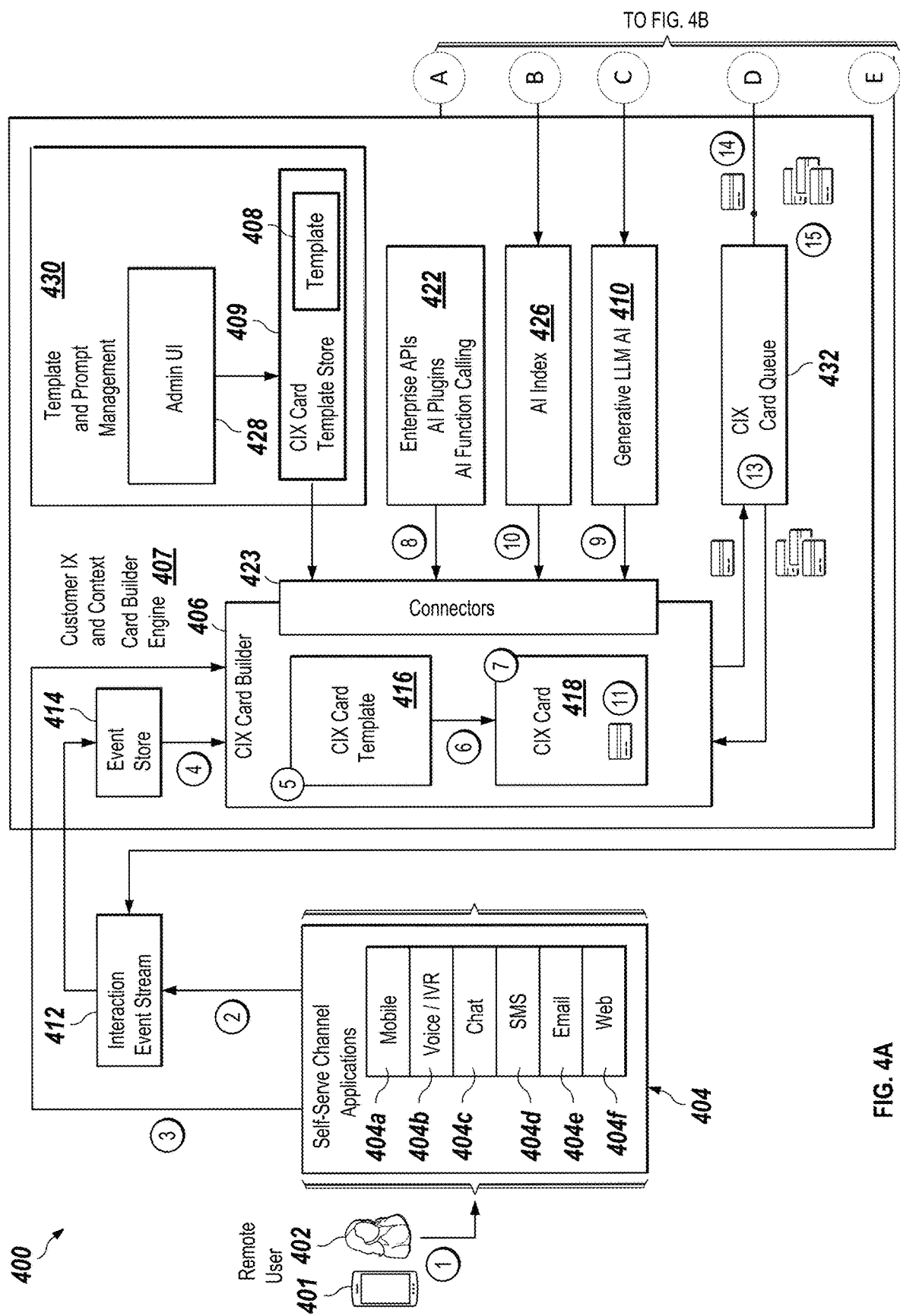
FIGS. 4A-B are a block diagram of an example system for using generative artificial intelligence for enhancing user experience.
Figure 4B:
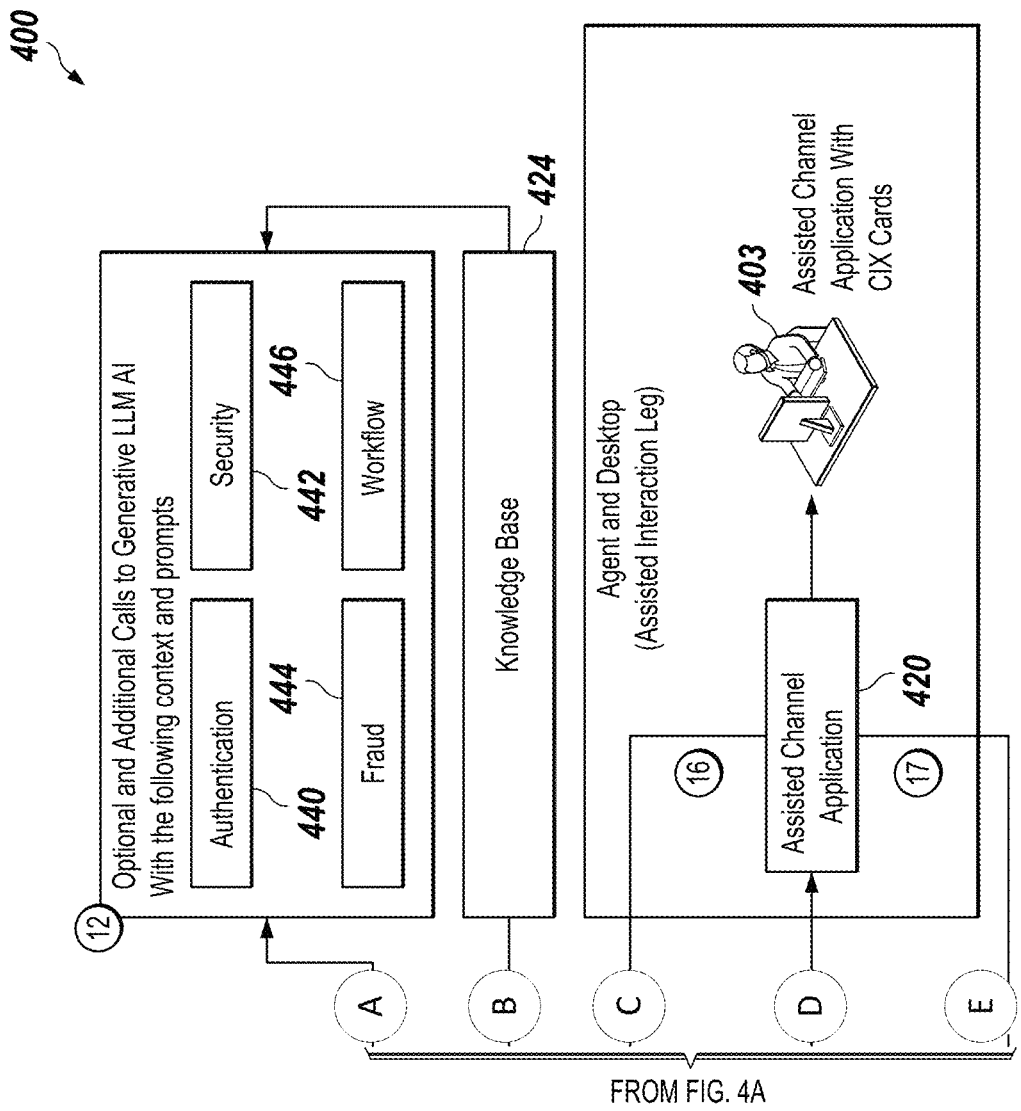

FIGS. 4A-B are a block diagram of an example system 400 for using generative AI for enhancing user experience. The system 400 can include different sub systems and entities for handling user interaction on a user device 401 by a user 402 with a system in both a self-serve mode and an agent-assisted mode in which the user 402 is assisted by an agent 403. FIGS. 4A-B illustrate various processing phases, illustrated as circled phase numbers, regarding interactions and activities that can occur in the system 400.

In a first stage, the user 402 accesses and interacts with a channel application 404. The channel application 404 can be one of different self-serve channel applications, such as a mobile application 404a, a voice (e.g., interactive voice response (IVR)) application 404b, a chat application 404c, a SMS (Simple Message Service) application 404d, an email application 404e, or a web application 404f (e.g., or web page). An event source, therefore, can be a contact center channel or a user device. Later events, in an assisted leg, can be provided by a device of the agent 403.

The channel application 404 can register with a card builder 406 (e.g., a CIX card builder) included in a CIX and context card builder engine 407. For example, the channel application 404 can send a registration message to the card builder 406. The card builder 406 can interpret the registration message received from the channel application 404 as a notification that the channel application 404 may start sending interaction events and as a request for an interaction identifier (which can be referred to as a CIX identifier) for the user interaction with the channel application 404. The channel application 404, when later generating event messages, can include the interaction identifier with other event information (e.g., as described in more detail below).

The registration message can include a card template identifier specific to the type of channel application 404. Card templates, which are described in more detail below, can define event, API (Application Programming Interface), and plugin information relevant to a particular channel application type. The card template identifier can be a name of a card template file or some other type of card template identifier that uniquely identifies a particular card template 408 in a card template store 409. In some cases, a card template identifier can be or correspond to a type of the channel application 404. As described in more detail below, the card builder 406 can build a CIX card, from a card template, that can assist the agent 403 in an interaction with the user 402, in conjunction with a generative LLM AI engine 410 (e.g., as described in more detail below).

The registration message can also include other information provided by the channel application 404. For example, the registration message can include a LOB (Line of Business) identifier associated with the interaction, location information (which may be obtained by the channel application 404 from a user device or user session), user language information, an interaction start timestamp, a channel type identifier identifying the type of channel application 404 (e.g., a channel type indicating one of the mobile application 404a, the voice application 404b, the chat application 404c, the SMS application 404d, the email application 404e, or the web application 404f), a media type indicator (e.g., voice, text, video), session information (which may include, for example, browser session information), and device information (e.g., device type information).

The card builder 406 can, in response to the registration message, determine a unique interaction identifier for the registration request. The card builder 406 can include the interaction identifier in a response message sent to the channel application 404 in response to the registration message.

In a second stage, the channel application 404 generates events (e.g., as an interaction event stream 412) based on interactions between the user 402 and the channel application 404. The channel application 404 can send the event messages in the interaction event stream 412 to an event store 414, for storage in the event store 414. As another example, the channel application 404 can send event messages to the CIX and context card builder engine 407 and the CIX and context card builder engine 407 can store received events in the event store 414. The event store 414 can be an internal event store included in the CIX and context card builder engine 407 or can be an external event store that is accessible, for example, by various components of the system 400, such as the card builder 406.

Regarding events, the different respective channel applications 404a, 404, 404c, 404d, 404e, and 404f can be provided by different vendors and can generate different types of events in different respective event streams. Accordingly, an event stream for one channel application 404 (e.g., the voice application 404b) can have different types of events, in different event formats, than another channel application 404 (e.g., the email application 404e).

As mentioned, the channel application 404 can, when generating an event message as part of the event stream 412, include the interaction identifier received from the card builder 406 in the event message. Each event message can also include an event identifier and an event counter which can be used for ordering events for an interaction by order of occurrence. As described in more detail below, event identifiers of events that might be generated by a channel application 404 can be defined in the card template associated with the type of the channel application 404. Event messages can include event payload information such as user input (e.g., user selections, user-entered data). Event payload information can be represented as key-value pairs, as described above with respect to FIG. 3. Event information can also indicate an interaction state in which the event occurred, such as Self-Serve Authenticated or Self-Serve Unauthenticated. As described below, events can also be streamed in later interaction legs, such as wait periods and assisted legs, and the interaction state can indicate authenticated and unauthenticated states for those types of interaction legs.

In a third stage, the channel application 404 with which the user 402 is interacting sends a signal of completion of the self-serve interaction (and any applicable wait state) to the card builder 406. The channel application 404 can include the interaction identifier in the signal of completion. The channel application 404 may send the signal of completion in response to determining, for example, that a particular event that occurs in the channel application 404 signals an end to the self-serve interaction (or to an end of a wait state). For example, the channel application 404 can detect that an event corresponds to the user 402 requesting transfer to an agent. As another example, the channel application 404 can detect that an event corresponding to a certain type of user input or user selection requires assistance of an agent (e.g., for approval). The signal of completion of the self-serve interaction can be a signal for the card builder 406 to retrieve events for the interaction, as described below.

In a fourth stage, the card builder 406 retrieves, from the event store 414, events that match the interaction identifier included in the signal of interaction completion received from the channel application 404. In some cases, the card builder creates an ordered list of retrieved events by ordering retrieved events by event counters included in retrieved event information. As described in more detail below, the card builder 406 can be configured to add context to retrieved event information that enriches raw event information, for example.

In a fifth stage, the card builder 406 retrieves a copy of the card template 408 from the card template store 409. That is, the card builder 406 can request from the card template store 409 a card template that has the card template identifier previously received from the channel application 404. As mentioned, the card template identifier can be a name of a card template file or another identifier that can be used to retrieve a card template.

The card builder 406 can load the copy of the card template 408 into memory, as a card template 416, and process the card template 416. The card template 416 can include sections for self-service, assisted service, wait period, and post interactions. Each of these sections can include event structure definitions that describe a structure of events that can occur during a particular type of interaction leg. The card template 416 can also include API information (e.g., including references to APIs). As described in more detail below, the card builder 406 can use the event structure information and the API information to build a CIX card 418 based on the card template 416.

In a sixth stage, the card builder 406 generates the CIX card 418 based on the card template 416. As described in more detail below with respect to a sixteenth stage, an application (e.g., an assisted channel application 420 and/or a self-serve application 404) can use the CIX card 418 to build context for a generative AI session between the generative LLM AI engine 410 and the agent 403 or the user 402, respectively, facilitated by the respective application.

To build the CIX card 418, the card builder 406 can parse the card template 416 to identify different sections of information, such as event structure and API definitions. As described in more detail below, the card builder 406 can process the identified event structure and the API information to obtain additional information to include in the CIX card 418. For example, the card builder 406 can adjust or populate a context string included in a respective event structure or API definition with retrieved event information. The context strings can form a context for the generative LLM AI engine 410.

Building the CIX card 418 based on event structure information is described in more detail below with respect to a seventh stage. For example, and as described in more detail below, the card builder 406 can match event information retrieved from the event store 414 to event structure definitions in the card template 416 and include enriched event information in context strings in the CIX card 418. Building the CIX card 418 based on using APIs is described in more detail below with respect to an eighth stage and a ninth stage. Additionally, further details regarding card template to CIX card creation processing are discussed below with respect to FIG. 9.

In a seventh stage, the card builder 406 updates the CIX card 418 with event context based on definitions in the card template 416 and event information from retrieved events. For example, the card builder 406 can iterate over the events retrieved from the event store 414 in the fourth stage. For each retrieved event, the card builder 406 can locate an event structure definition in the card template 416 that has an event identifier that matches an event identifier in the retrieved event.

The card builder 406 can determine if a context string included in the event structure definition includes any placeholders. The card builder 406 can locate placeholders in a context string by locating special placeholder delimiters. For example, a placeholder can be represented in a context string by a placeholder key surrounded by double curly brackets (e.g., {{ }}). For each located placeholder, the card builder 406 can extract the placeholder key. For each extracted placeholder key, the card builder 406 can locate, in event information for the retrieved event, a key-value pair that has a key that matches the placeholder key. The card builder 406 can extract the value from the located key-value pair and replace, in the context string in the card template 416, the placeholder key with the extracted value. Accordingly, the modified event structure definition in the card template 416 (or in the CIX card 418 itself, depending on exactly how the card builder 406 creates the CIX card 418 from the card template 416) has both semantic event information that describes the event and real-time event data from the event itself. Accordingly, the card builder 406 can use enriched event context information when building the context for the generative LLM AI engine 410, as described in more detail below.

In the eighth stage, data from different APIs can be obtained to further build context for the generative LLM AI engine 410. The card builder 406 can include API output data in the CIX card 418, for example. As mentioned, the card template 416 can include API references. The API references can refer to different types of APIs 422, such as enterprise APIs (e.g., APIs available in or provided by the contact center platform), AI plugins, AI functions, or other types of APIs or functions (e.g., including APIs provided by external parties). Examples of enterprise APIs for unauthenticated users are APIs that can return currently active promotions or determine and describe how long a customer has had to wait while being transferred to an agent. Examples of enterprise APIs for authenticated users are APIs that can return detailed customer information for a customer or product status information and product details for a customer who has a certain type of product.

In some implementations, the card builder 406 includes or uses different connectors 423 to manage API invocation and API input/output handling. The connectors 423 can include and encapsulate details regarding API endpoints, secrets, authentication, connectivity, error handling, and API request and response handling.

In some implementations, API invocation can occur while the card builder 406 is iterating over events that have been retrieved for the interaction. For example, for each retrieved event, the card builder 406 can determine whether the card template 416 includes any matching connector sections that have a same event identifier as the event. If one or more matching connector sections are identified, matching connector sections can be ordered by sequence identifiers included in the respective matching connector sections. The card builder 406 can then interact with matching connectors referenced in matching connector sections, in sequenced order.

For example, for each matching connector, the card builder 406 can prepare input data for the matching connector and ask the matching connector to invoke an API referenced in the matching connector section. For example, matching connector sections can include a context string that can be provided as input to the matching connector. Context strings can have placeholders, similar to the placeholders described above for event context strings. The card builder 406 can replace placeholders in connector context strings with event data, as described above for event enrichment. The card builder 406 can then provide the context string, after placeholders have been replaced, to the connector. In some implementations, however, the card builder 406 can provide event key-value pairs and the context string with placeholders to the connector and the connector can perform placeholder replacement. For some context strings, context string placeholders represent placeholders for API output.

The context string can be provided to the connector in or as a request to invoke the API referenced in the connector section of the connector. The connector can, therefore, invoke the requested API, by providing at least a portion of the context string as input data to the API in a format acceptable by the API. The connector can receive API output from invoking the API and can also manage any error handling that may occur as a result of the connector interacting with the API. The connector can return API output data to the card builder 406, perhaps after some reformatting or processing of the API output data. For instance, in some cases, API output might not be appropriate for direct inclusion in a context string in the card template 416, and the connector 423 can include logic for reformatting or filtering API output before providing data related to the API invocation to the card builder 406. The card builder 406 can replace a current context string (or in some cases, placeholders in the context string) in the connector section in the card template 416 with the data received from the connector. Accordingly, the card template 416 (and eventually the CIX card 418 itself) is enriched with API output data.

The API information in the card template 416 can include AI plugin and AI function information regarding plugins that can be used with the generative LLM AI engine 410 (or another AI engine) or invocable functions of the generative LLM AI engine 410. While in some implementations, the card builder 406 (or an appropriate connector 423) can invoke such AI plugins or functions to add context to the CIX card 418, in other cases API information in the card template 416 can be included in a prompt provided later to the generative LLM AI engine 410 to enable the generative LLM AI engine 410 to use those plug-ins during generative AI sessions with the assisted channel application 420 or the self-serve channel application 404.

Some APIs can be configured to obtain data from a knowledge base 424. The knowledge base 424 can include various types of information and documents, such as information sources that include information on promotions, known issues, products, procedures, etc.). Although the knowledge base 424 can be queried by API(s) in the eighth stage, the knowledge base 424 can also be queried in a tenth stage, after keyword generation has been performed, as described in more detail below.

In a ninth stage, the card builder 406 can perform a first interaction with the generative LLM AI engine 410. For example, the card builder 406 can create a first generative AI request that includes the card template 416 (or CIX card 418) that includes the contextualized event information generated in the seventh stage and the API output generated in the eighth stage and a prompt that requests the generative LLM AI engine 410 to generate the following based on information in the card template 416 (or CIX card 418): 1) an interaction summary (e.g., from contextualized event data); 2) an authentication summary (e.g., from state information in event data); 3) user conversation summary (e.g., chat summary, voice transcript summary); and 4) sentiment analysis (e.g., based on user conversation text and/or the user conversation summary). Additionally, the prompt can request the generative LLM AI engine 410 to generate keywords based on the information in the card template 416 and/or based on some or all of items 1) to 5) generated by the generative LLM AI engine 410 in a first step. The generative LLM AI engine 410 can return the items 1) to 5) and generated keywords to the card builder 406. Furthermore, the prompt can request the generative LLM AI engine 410 to generate a greeting applicable for reading by the agent 403 to the user 402 when an assisted leg begins, based on one or more of these items 1) to 5). The greeting can be applicable for the user 402 given the interaction state, wait time, authentication state, interaction history, and other information relevant to the current state of the user's interaction with the system, for example.

In a tenth stage, the card builder 406 can obtain knowledge base information relevant to generated keywords. For example, an AI index engine 426 can generate and maintain an index of unstructured information in the knowledge base 424. The card builder 406 can query the AI index (e.g., using a connector) by requesting the AI index to identify documents and document portions that are relevant to the keywords provided to the card builder 406 by the generative LLM AI engine 410 in the ninth stage. The AI index engine 426 can generate citations, links to relevant documents, and relevant document portions relevant to one or more keywords. The AI index engine 426 can provide the citations, links, and document portions to the card builder 406.

In an eleventh stage, the card builder 406 can populate the CIX card 418 with the information received from the generative LLM AI engine 410 in the ninth stage and the information received from the AI index engine 426 in the tenth stage. Accordingly, the CIX card 418 can include, as a context prompt, an interaction summary, an authentication summary, a keyword list, citations and links, keyword-relevant document portions, API output, contextualized event information, sentiment analysis, and a contextualized, personalized greeting (e.g., for authenticated users).

The card builder 406 can also include, in the CIX card 418, a system prompt for the generative LLM AI engine 410 that can instruct the generative LLM AI engine 410 to use the CIX card 418 as overall context for a generative AI session with the agent 403 during an upcoming assisted interaction leg. For example, the system prompt can prompt the generative LLM AI engine 410 that its role is to help the agent 403 with interactions with the user 402. The system prompt can include some background information that describes what the sections of the CIX card 418 include, including descriptions of interaction stages. The system prompt can prompt the generative LLM AI engine 410 to provide, to the agent 403, a summary of interaction events and the greeting that the agent 403 can use to greet the user 402. The system prompt can notify the generative LLM AI engine 410 that the context of the CIX card 418 (which can be represented by a context prompt) can be used as a basis for agent/generative LLM AI engine 410 question and answer conversations. Other prompts can include indications of enabled plugins and an instruction to the generative LLM AI engine 410 that it can use the enabled plugins for additional information.

The default and static portions of prompts can be maintained (e.g., by system administrators) using an administrative user interface 428 of a template and prompt management system 430. Administrators can engineer various types of prompts for the generative LLM AI engine 410, such as system prompts, context prompts, prompts to generate insights, and other prompts. Administrators can iteratively engineer prompts to produce desired outcomes from the generative LLM AI engine 410.

The administrative user interface 428 can also be used to create and edit card templates, for example. The administrator can define a new card template for a new channel application (or a channel application not yet supported in the system 400). The administrator can, using the administrative user interface 428, select or open a skeleton template that can be used as a basis for defining card templates for different channel applications. The skeleton template can have a skeletal structure with sections in place for different interaction legs such as self-serve unauthenticated, self-serve authenticated, wait state unauthenticated, wait state authenticated, assisted unauthenticated, assisted authenticated, post interaction unauthenticated, and post interaction authenticated. The skeleton template can also include a section for defining connectors. The administrator can fill in these sections, in a copy of the skeleton template, with appropriate event and channel definitions, to create a card template for a channel application. The card template store 409 can thus include different card templates for different channel applications. As described above, the card builder 406 can retrieve a copy of a respective card template when an interaction with a particular type of channel application begins.

In a twelfth stage (e.g., as shown in FIG. 4B), the card builder 406 can invoke the generative LLM AI engine 410 to generate various insights based on contents of the CIX card 418 (e.g., based on a context prompt that has been generated for the CIX card 418). In some implementations, the CIX card 418 includes various prompts (e.g., copied from the corresponding card template 416) that can be used to generate insights. For example, different prompts can be submitted by the card builder 406 to the generative LLM AI engine 410 to generate insights or analysis regarding user authentication 440, security 442, fraud 444, and/or workflow 446 (e.g., with respect to organizational procedures). The generated insights/analysis can be stored in the CIX card 418.

In a thirteenth stage, the CIX card 418 is placed in a card queue 432. The card queue 432 can store the current CIX card 418 as well as historical cards that include information for previous interactions of the user 402 (and other users). If the user 402 is authenticated, the CIX card 418 can be stored in the card queue 432 mapped to a user identifier for the user 402. For unauthenticated users, the CIX card 418 can be stored in the card queue 432 using some other type of identifier, such as a phone number from which the user 402 has dialed, a session identifier of a channel application 404, or some other type of unique channel identifier.

In a fourteenth stage, as part of initializing the assisted channel application 420 for the user 402 during the transition of the user 402 from a self-serve interaction leg to an assisted interaction leg, the assisted channel application 420 can fetch the CIX card 418 for the current interaction from the card queue 432.

In a fifteenth stage, the assisted channel application 420 may also fetch one or more historical cards for the user 402 from the card queue 432. For example, the assisted channel application 420 can process the CIX card 418 that was retrieved from the card queue 432 to determine whether the user 402 was authenticated in the self-serve interaction leg. If the user 402 was authenticated in the self-serve interaction leg, the assisted channel application 420 can extract a user identifier from the current CIX card 418 and then retrieve historical CIX cards from the card queue 432 that have the same user identifier. Accordingly, the assisted channel application 420 can have (and can present) both the current CIX card and historical CIX cards of the user 402 that summarize historical interactions of the user 402.

In a sixteenth stage, the agent 403 and the assisted channel application 420 interact with the generative LLM AI engine 410 during an assisted leg of the interaction. For example, the assisted channel application 420 can extract a system prompt and context prompt from the CIX card 418 and provide the system prompt and the context prompt to the generative LLM AI engine 410. The system prompt can provide an overview of a role and main task of the generative LLM AI engine 410 during the interaction. The assisted channel application 420 can use the context prompt to set a context window of the generative LLM AI engine 410.

The agent 403 and/or the assisted channel application 420 can then interact with the generative LLM AI engine 410. For example, the assisted channel application 420 can, in response to receiving a user input from the agent 403 representing an agent question for the generative LLM AI engine 410, provide the question to the generative LLM AI engine 410. The generative LLM AI engine 410, with its context established based on the context prompt and system prompt previously received from the assisted channel application 420, can formulate an answer to the question and provide the answer to the assisted channel application 420. The assisted channel application 420 can update itself in response to information received from the generative LLM AI engine 410. For example, the assisted channel application 420 can update an application user interface to display the answer to the agent 403. The agent 403 can use the assisted channel application 420 to process the interaction using the answer received from the generative LLM AI engine 410 (e.g., to respond to the user 402, provide information to the user, interact with one or more backend systems to update a user account, etc.).

In a seventeenth stage, the assisted channel application 420 can act as an event generator by capturing events performed in the assisted channel application 420, including interactions with the generative LLM AI engine 410. For example, the assisted channel application 420 can stream captured/generated events to the event store 414. The events streamed by the assisted channel application 420 can be used by the card builder 406 to update the CIX card 418. The assisted channel application 420 can also dynamically send events to the generative LLM AI engine 410 so that the generative LLM AI engine 410 can dynamically update its context with events generated by the assisted channel application 420 as well as with query-response information the generative LLM AI engine 410 has generated for the assisted channel application 420. Accordingly, the generative LLM AI engine 410 can provide up to date and accurate answers to further questions that may sent to the generative LLM AI engine during the interaction.

Figure 4C:
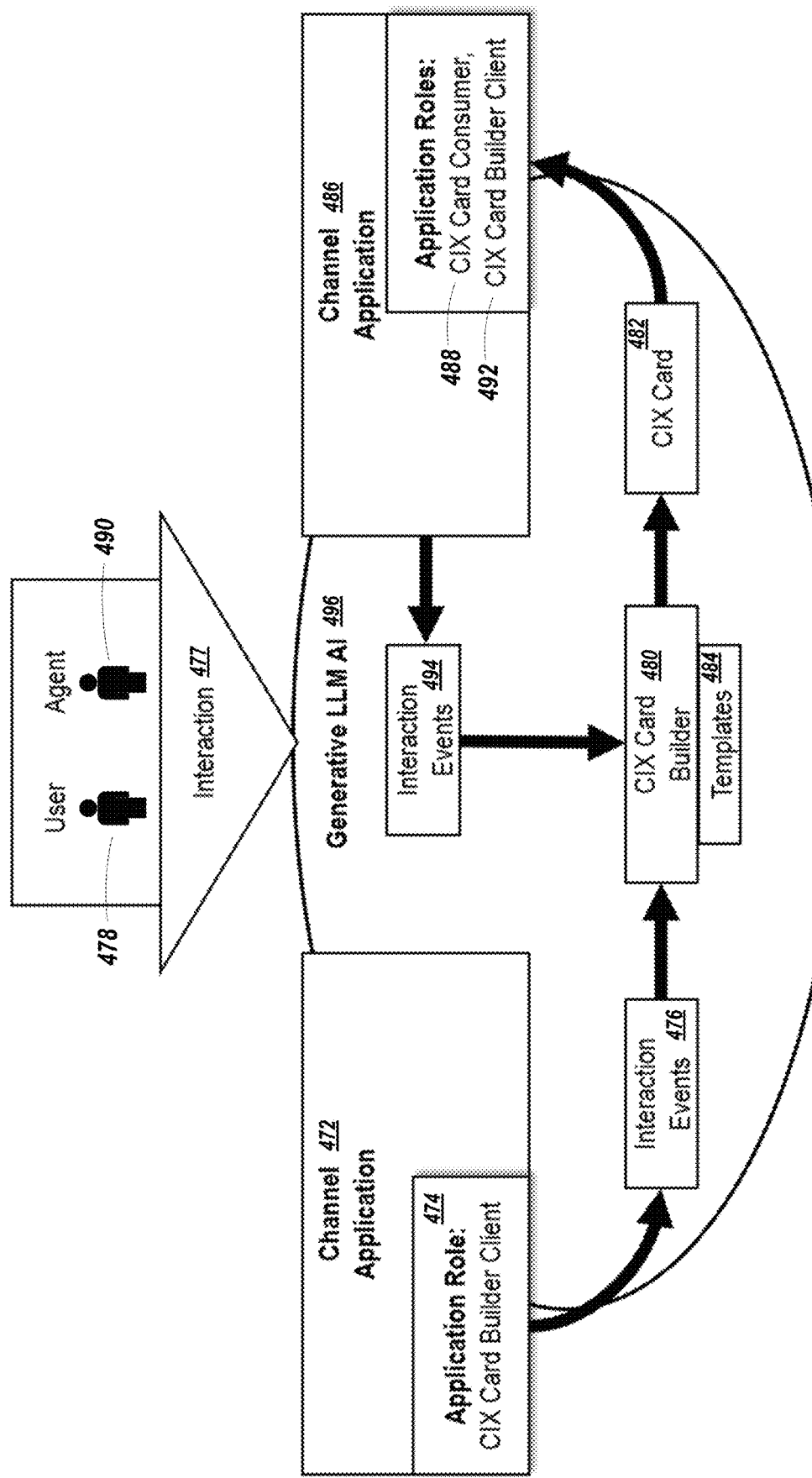
FIG. 4C illustrates an example system illustrating different roles for channel applications.

FIG. 4C illustrates an example system 470 that illustrates different roles for channel applications. A first channel application 472 can have a first role of a CIX card builder client 474, in that the first channel application 472 can be generating interaction events 476 during an interaction 477 with a user 478 that can be used by a CIX card builder 480 to create a CIX card 482 (e.g., where the CIX card 482 can be based on a template included in templates 484 used by the CIX card builder 480). A second channel application 486 can have a second role of CIX card consumer 488 in that the second channel application 486 may consume the CIX card 482 during an assisted leg of the interaction 477, such as when an agent 490 uses an assisted channel application to assist the user 478.

The second channel application 486 can also have the first role (e.g., CIX card builder client 492) in that the second channel application 486 can be generating interaction events 494 in the assisted leg, which can be retrieved and used by the CIX card builder 480 for updating of the CIX card 482, for use by the second channel application 486 (and/or by another channel application (e.g., such as another assisted channel application used by another agent in a later interaction for the user 478, such as if the user 478 contacts the contact center at a later point in time)). As described above, and as described in more detail below, a generative LLM AI engine 496 can be used at various stages of creation and updating of the CIX card 482 and in sessions with channel applications such as the second channel application 486.

Figure 5:
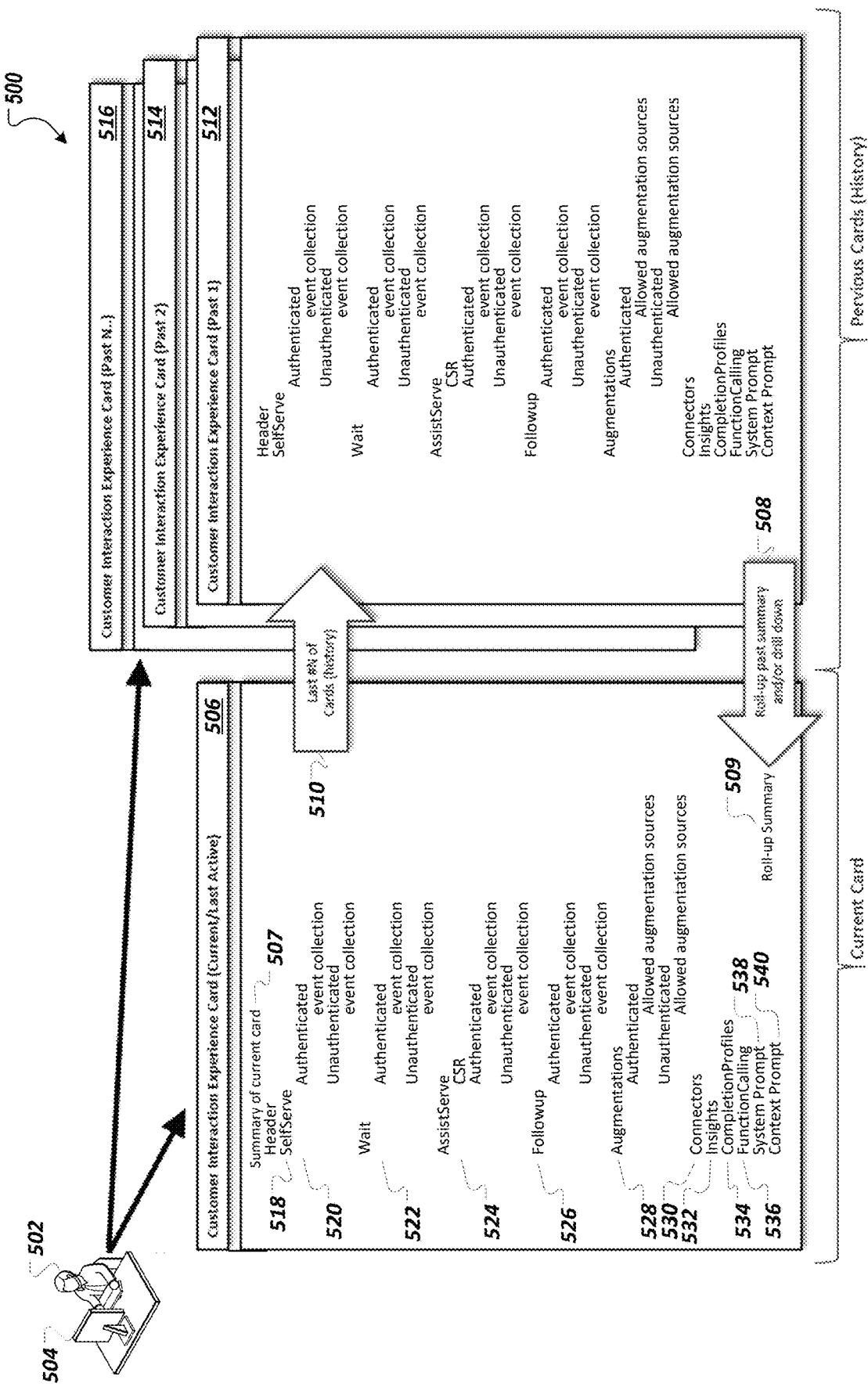
FIG. 5 is a diagram that illustrates example customer interaction context cards.

FIG. 5 is a diagram 500 that illustrates example customer interaction context cards. An agent 502 can view CIX cards in an assisted channel application on an agent device 504 during an assisted leg interaction, for example. The assisted channel application can display a current card 506 for the current interaction. The current card 506 can include summary information 507 for the current interaction including summary and detailed information for events that have occurred so far in the interaction, including in a self-serve leg and an assisted leg that began when the user was transferred to the agent 502. Summary information 507 can be information that was added to the current card 506 by a generative LLM AI engine (e.g., the generative LLM AI engine 130 or the generative LLM AI engine 410).

As indicated by an arrow 508, the current card 506 can also include a rollup summary 509 of information that was generated by the generative LLM AI engine, for example, from a set of previous cards previously generated for the user for past interactions of the user. As indicated by an arrow 510, in some implementations, the assisted channel application enables the agent 502 to pull up and view the previous cards for the user, such as previous cards 512, 514, and/or 516.

In further detail, the current card 506 (and the previous cards 512, 514, and 516) can include a header section 518 that includes a collection of identifiers and other information. Header information is described in more detail below with respect to FIG. 11. A self-serve section 520 includes event information for when the interaction is in a self-serve leg, and can include events that occurred when the user was authenticated and events that occurred when the user was not authenticated. A wait section 522 includes event information for when the interaction is in a wait state (for when the user is authenticated or unauthenticated).

An assist-serve section 524 includes event information for when the interaction is in an assisted leg (for when the user is authenticated or unauthenticated). A follow-up section 526 includes event information for when the interaction has follow-up activities after the assisted leg, including when the user is authenticated or unauthenticated.

The assist-serve section 524 can include CSR (Customer Service Representative) information regarding the agent 502 that is handling the interaction with the user/customer during the assisted leg. The CSR information in the assist-serve section 524 can be populated based on CSR information provided by the assisted channel application. The CSR information can provide context regarding the agent 502 and can track which agent was helping the user during the interaction.

An augmentations section 528 includes information regarding augmentation sources that can be or have been used by the generative LLM AI engine to add additional context to the card. Some augmentation sources can be invoked when the user is authenticated and other augmentation sources can be invoked when the user is unauthenticated. Augmentation sources can be invoked using connectors defined in a connector section 530. An insights section 532 can include information that can be used by the generative LLM AI engine to evaluate a current context prompt, to obtain further insights (which can then be added to the card). A completion profiles section 534 can include configuration parameters that can be used by the generative LLM AI engine during handling of requests. A function-calling section 536 can include a list of generative LLM AI functions that can be enabled in the generative LLM AI engine for use in a generative LLM AI session with the assisted channel application. A system prompt 538 can be provided to the generative LLM AI engine as an overview prompt for the generative LLM AI engine. A context prompt 540 can be provided to the generative LLM AI engine and can include contextual information (from enriched event data, augmentation sources, etc.) that has been accumulated and/or generated for the interaction.

Figure 6:
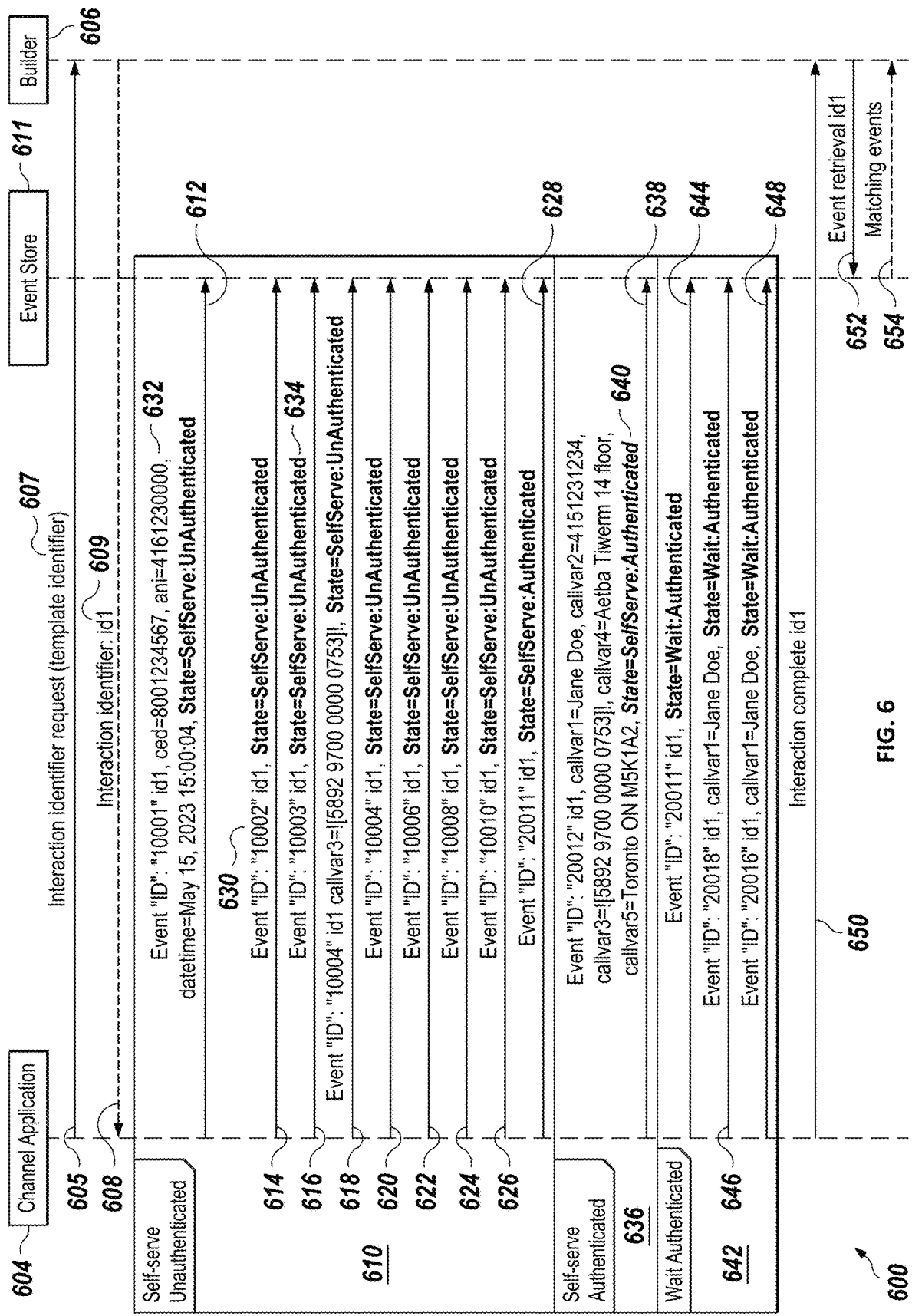
FIGS. 6, 7A, 7B, and 8 are example swim lane diagrams.

FIG. 6 is a swim lane diagram of an example process 600. The process 600 corresponds to the first, second, third, and fourth stages described for FIGS. 4A-B. A channel application 604 (which can be the channel application 404) can send an interaction identifier request 605 to a card builder 606 (which can be the card builder 406). The interaction identifier request 605 can be a request for an interaction identifier for a user (customer) interaction that is about to start in the channel application 604. The interaction identifier request 605 can include a template identifier 607 of a card template that the card builder 606 can use for generating a CIX card for the interaction. The card builder 606 can generate and return an interaction identifier 609 to the channel application 604.

The channel application 604 receives the interaction identifier 609. As events occur in the channel application 604 during the interaction, the channel application 604 can include the interaction identifier 609 in event messages that the channel application 604 generates for the events. For instance, a first set of events can occur when an interaction state is self-serve unauthenticated 610. As events occur in the channel application 604, the channel application 604 can generate and stream event messages, each including the interaction identifier 609, to an event store 611. The event store 611 can be the event store 414. For instance, the channel application 604 can stream event messages 612, 614, 616, 618, 620, 622, 624, 626, and 628. Each event message can have an event identifier (e.g., an event identifier 630 of "10002" in the event message 614), key-value pair event data (e.g., a key-value pair 632 of "ani=4161230000" in the event message 612), and interaction state during the event (e.g., an interaction state 634 of "Self-Serve: Unauthenticated). Event messages can each also have an event sequence number (not shown) that indicates, among a group of event messages, an order of occurrence of the event messages. The card builder 606 can use event sequence numbers to order events retrieved from the event store 611, as described below. Event messages can have a unique event instance identifier (e.g., a UUID (Universally Unique Identifier) that is unique across channel applications. If the card builder 606 encounters different event instance identifiers of a same event identifier, the card builder 606 can determine that the channel application 604 generated multiple events of a same event type. The event identifier 630 can represent an event type, for example. Although the event identifier 630 is shown as an example five digit identifier, in some implementations, event identifiers (e.g., event type identifiers) can also be represented as UUIDs.

A second set of events can occur when an interaction state is self-serve authenticated 636. For example, the channel application 604 generates and sends an event message 638, which has an interaction state 640 of "Self-Serve: Authenticated". Similarly, a third set of events can occur during a wait state 642 (e.g., while the user is authenticated but waiting to be connected to an agent). For example, the channel application 604 generates and sends event messages 644, 646, and 648, each which have an interaction state of "Wait: Authenticated".

When the channel application 604 determines that the wait state is ending (e.g., the user is being transferred to an agent), the channel application 604 can send an interaction complete message 650 to the card builder 606. The interaction complete message 650 can trigger the card builder 606 to retrieve event messages from the event store 611 that include the interaction identifier 609. For example, the card builder 606 can send an event retrieval request 652 to the event store 611 requesting retrieval of events that include the interaction identifier 609. The event store 611 can provide matching events 654 to the card builder 606. The process 600 can continue as described below for FIGS. 7A-7B.

Figure 7A:
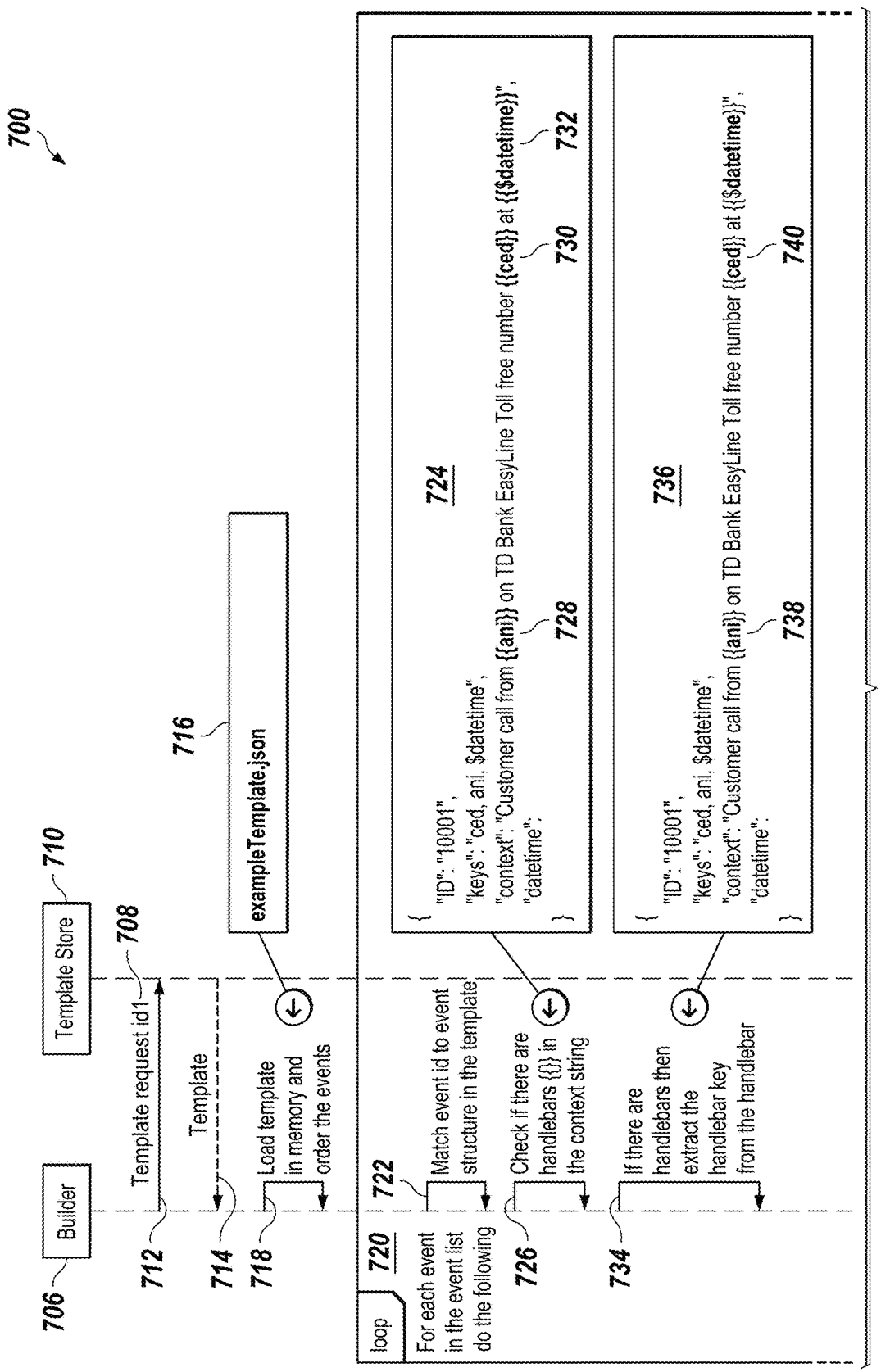
Figure 7B:
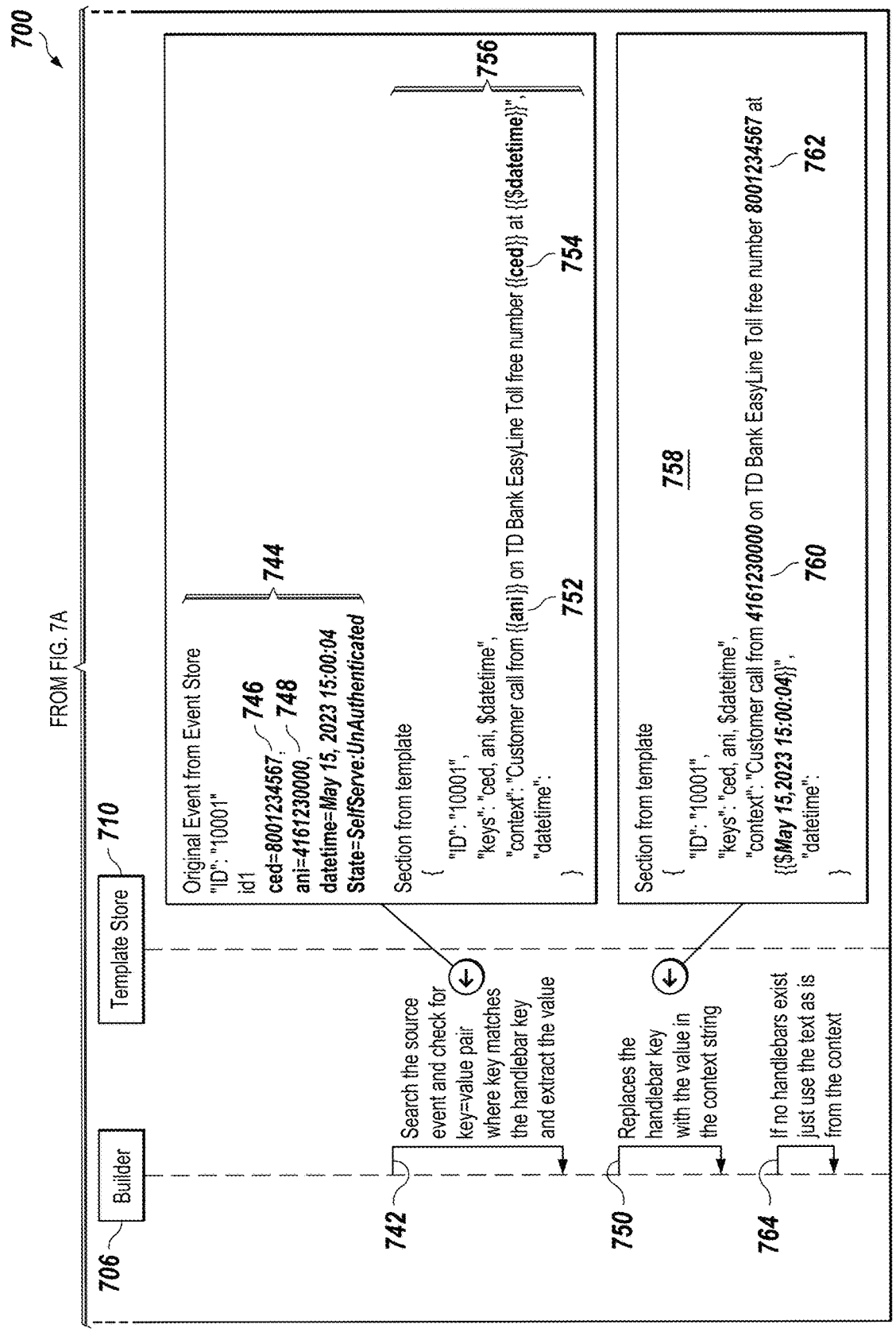

FIGS. 7A-7B illustrate a swim lane diagram of an example process 700. The process 700 can be a continuation of the process 600 described above with respect to FIG. 6. The process 700 corresponds to the fifth and seventh stages described for FIGS. 4A-B. The process 700 can be performed after a card builder 706 (which can be the card builder 406 and/or the card builder 606) has retrieved events for a particular interaction from an event store. The card builder 706 can send a template request 708 to a template store 710. The template request 708 includes a template identifier 712 that the card builder 706 had previously mapped to an interaction identifier for the interaction. The template store 710 can provide the requested template 714 in response to the template request 708. The template in this example can be a template file 716 named "exampleTemplate.json", portions of which are included in FIG. 7A for illustration.

At 718, the card builder 706 can load the template file 716 into memory and order events retrieved from the event store (e.g., by order of occurrence in the channel application, such as by event sequence number). The card builder 706 can perform iterative processing 720 over the retrieved events (e.g., the card builder 706 can perform certain processing for each event). For example, at 722, the card builder 706 can match the event identifier of a retrieved event to an event structure in the template (e.g., the card builder 706 can find an event structure in the template that has a same event identifier as the event). For instance, the card builder 706 can, for the event corresponding to the event message 612, locate an event structure 724 in the template.

At 726, the card builder 706 can determine if there are any placeholders (e.g., handlebar delimiters ({{ }})) in a context string included in the event structure. For instance, the card builder 706 can determine that the event structure 724 includes placeholders 728 and 730. Note, a placeholder 732 can be a different type of placeholder, that can be replaced (e.g., by the card builder 706) with a current date and time (or another value).

At 734, the card builder 706 can, for any located placeholders, extract a placeholder key (e.g., "handlebar key") from each placeholder. For instance, as shown in an event structure 736 that corresponds to the event structure 724), the card builder 706 can extract an "ani" key 738 and a "ced" (caller entered digits) key 740.

At 742, as shown in FIG. 7B, the card builder 706 can search event data (e.g., event key-value pairs) for the event for a key-value pair that has a key equal to a retrieved placeholder key. For instance, the card builder 706 can search the event data for key-value pairs that have a key of "ani" or a key of "ced". If a matching key is found, the card builder 706 can extract the value from the matching key-value pair in the event data. For instance, in example event data 744 (e.g., corresponding to the event message 612), the card builder 706 can locate "ani" and "ced" keys and extract a ced value 746 of "8001234567" and an ani value 748 of "4161230000", respectively.

At 750, for each extracted value, the card builder 706 can replace a corresponding placeholder key (e.g., handlebar key) in the event structure with the extracted value. For instance, the card builder 706 can replace placeholder keys 752 and 754 in an event structure 756 that corresponds to the event structure 736. For instance, an updated event structure 758 includes a copy 760 of the ani value 748 and a copy 762 of the ced value 746 instead of the placeholder keys 752 and 754, respectively. As another example, if a matching event structure has no placeholders, at 764, a context string can be used as-is for inclusion in a CIX card.

Figure 8:
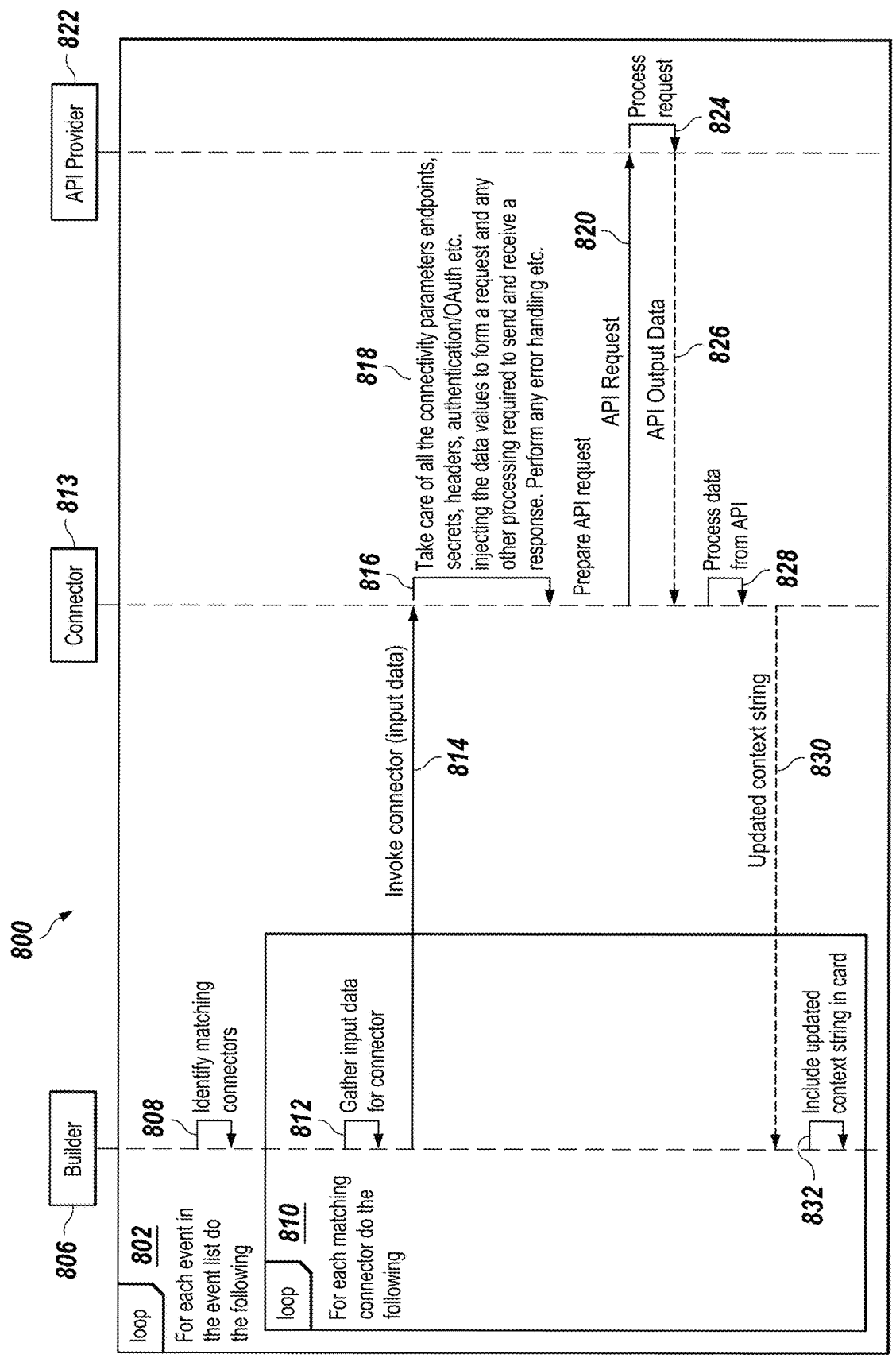

FIG. 8 is a swim lane diagram of an example process 800. The process 800 can be a continuation of the process 700 described above with respect to FIGS. 7A-7B. The process 800 corresponds to the eighth stage described for FIGS. 4A-B. The process 800 is a continuation of iterative processing 802 in which a card builder 806 (which may be any of the card builders 406, 606, or 706) processes each event retrieved from an event store. The iterative processing 802 is a continuation of the iterative processing 720, for example.

At 808, the card builder 806 can determine whether a card template being processed includes any matching connector sections that have a same event identifier as the event. The card builder 806 can perform iterative processing 810, performing operations for each matching connector.

For example, at 812, the card builder 806 can prepare input data for the matching connector. For example, matching connector sections can include a context string that can be provided as input to the matching connector. Context strings can have placeholders, similar to the placeholders described above for event context strings. The card builder 806 can replace placeholders in connector context strings with event data, as described above for event enrichment. As another example, the card builder 806 can provide a context string with placeholders and event data, for the matching connector (e.g., a connector 813), to perform placeholder replacement.

At 814, the card builder 806 can invoke the connector 813 with the prepared input data, to ask the connector 813 to invoke an API referenced in the matching connector section. At 816, and as described in a note 818, the connector 813 can handle connectivity parameters, endpoints, secrets, headers, authentication (e.g., OAuth authentication), etc., for API invocation. The connector 813 can also, as part of preparing the API request, do placeholder replacement (e.g. injecting event data values into a context string), or any other processing for preparing an API request or preparing to receive an API response.

At 820, the connector 813 invokes the API by sending an API request to an API provider 822 that provides the API. The API provider 822 can be the contact center platform itself, an external API provider, a generative AI engine, or some other type of API provider. The API request can include input data for the API provider that was prepared by the connector 813 at 816. At 824, the API provider 822 processes the API request, using input data provided by the connector 813 in the API request. At 826, the API provider 822 provides API output to the connector 813. The connector 813 can manage any error handling that may occur as a result of the connector 813 interacting with the API provider 822.

At 828, the connector 813 processes data received from the API provider 822. For example, the connector 813 may reformat or filter API output data. At 830, the connector 813 can provide processed API output (which can be referred to as an updated context string) to the card builder 806. At 832, the card builder 806 can replace a current context string in the connector section in the card template with the updated context string received from the connector 813. Accordingly, the card template can be enriched with API output data.

Figure 9:
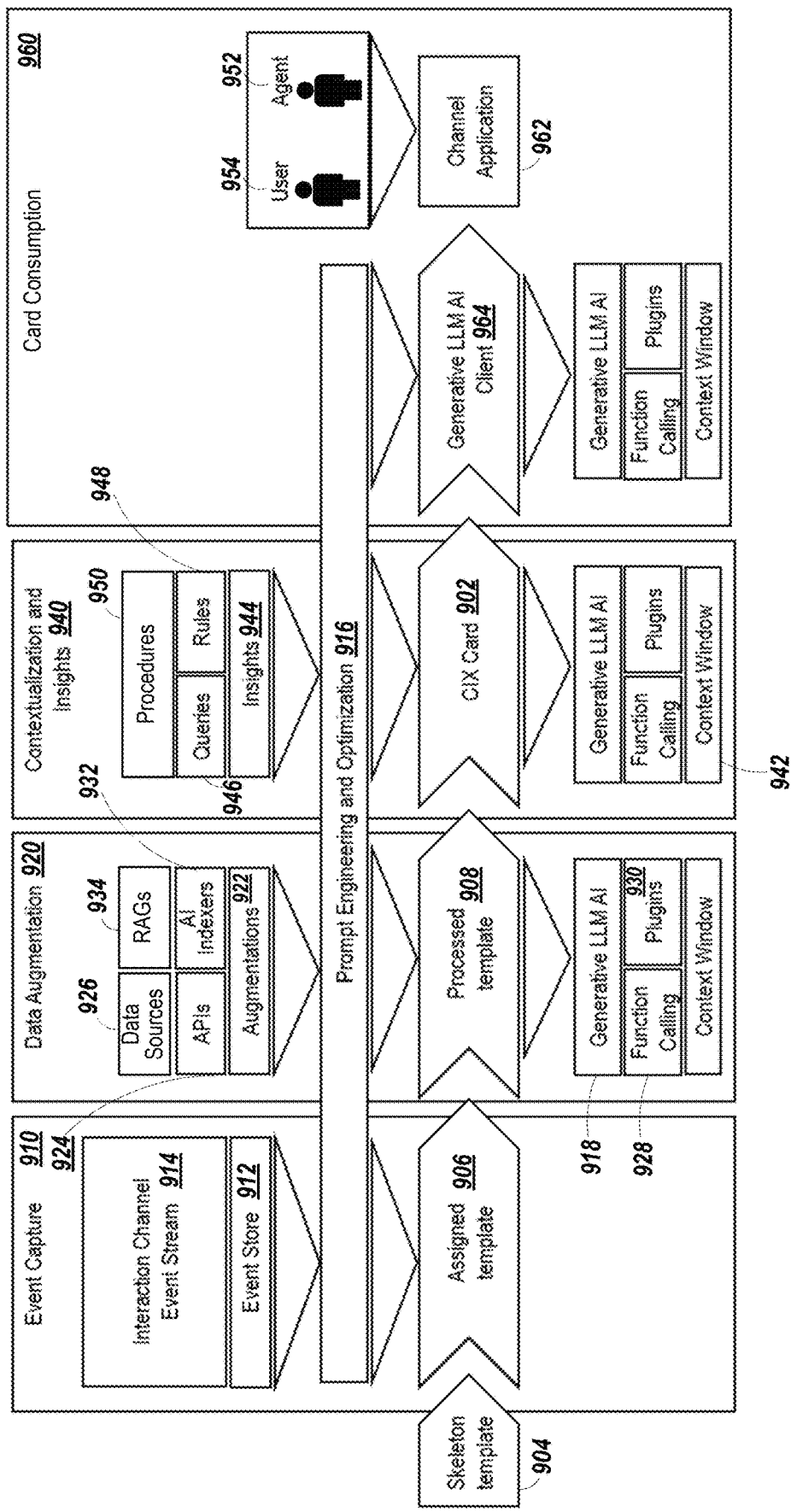
FIG. 9 is a diagram that illustrates creation of customer interaction experience cards from various types of templates.

FIG. 9 is a diagram 900 that illustrates creation of CIX cards from various types of templates. A CIX card 902, for example, can be created from a progression of processing that can involve a skeleton template 904, an assigned template 906, a processed template 908, and finally the CIX card 902. The assigned template 906 can be a template for card creation based on an interaction using a certain type of channel application. The assigned template 906 can be assigned to the certain type of channel application, for example. Administrators can create an assigned template 906 for each type of channel application used in the system. The administrator can use the skeleton template 904 as a basis for creating the assigned template 906. The skeleton template 904 can provide a hierarchical outline structure that represents a hierarchical object hierarchy. The skeleton template 904 that include a structure that includes sections for events for different interaction legs, for unauthenticated and authenticated states. The skeleton template 904 can also include an outer outline structure for other types of sections, such as augmentations, connectors, plugins, etc.

The assigned template 906 can be used in an event capture stage 910 in which the processed template 908 is created/populated based on the assigned template 906 and on events retrieved by a card builder from an event store 912 that have been streamed to the event store 912 as an interaction channel event stream 914 during a user interaction with a channel application. The event capture stage 910 corresponds to the first through fifth stages described above with respect to FIGS. 4A-4B. The assigned template 906 that is assigned to a channel client application use case can include event definitions each identified by an event identifier. The card builder can retrieve the assigned template 906 as a copy of an assigned template, from template storage (e.g., the template store 409). The assigned template in the template store can be represented as a BLOB (Binary Large OBject), a file, database record(s), or some other type of storage or data structure. The card builder can retrieve a copy of the assigned template, with the copy serving as the assigned template 906 for an interaction, so that the template store can continue to provide original versions of the assigned template for other interactions. The card builder can use the assigned template 906 as a read-only data source, to retrieve event definitions (e.g., representing event structure, with possible placeholders) for matching against retrieved events obtained from the event store 912.

Each event definition can correspond to a certain possible interaction scenario or set of interaction scenarios that may occur in the channel application type assigned to the assigned template. Event definitions in the assigned template 906 can have context strings that describe the event and that are engineered during prompt engineering and optimization activities 916 to be in a format suitable for inclusion in a context prompt for a generative LLM AI engine 918. As the card builder matches retrieved events from the event store 912 to event definitions in the assigned template 906, event enrichment can occur, to generate enriched event information, as described above. Enriched event context strings can be copied into the processed template 908. Accordingly, although the assigned template 906 can include event definitions of all types of events that may occur in the channel application use case associated with the assigned template 906, the processed template 908 includes event information for events for which event data was retrieved from the event store 912.

For some events, a context string may be copied from the assigned template 906 to the processed template 908 without modification. For other events, the context string is updated with retrieved event data, as described above. The assigned template 906 can also include context strings at group levels of the assigned template (e.g., corresponding to a particular interaction leg, or unauthenticated or authenticated portion. Such context can be generally descriptive of events at that level (e.g., "events occurring during a self-serve interaction leg", "authorized events occurring during a wait state"). The card builder can also copy such broader contextual descriptions from the assigned template 906 to the processed template 908.

Different approaches can be used to transition from the assigned template 906 to the processed template 908. For example, the processed template 908 can initially be created as a copy of the skeleton template 904 and information can be copied from the assigned template 906 and populated into the processed template 908. Event enrichment can occur as events are retrieved and enriched events can be copied into the processed template 908. For example, the card builder can use the assigned template 906 to extract objects (e.g., event structure definitions and other objects) and can processed extracted objects to create the processed template 908. The card builder, for example, can process the assigned template 906 object structure under each matched event identifier and use the object structure (and retrieved event information) to create a populated object in the processed template 908.

As another example, event enrichment can occur inline in the assigned template 906 and the processed template 908 can be created as a copy of the assigned template 906 and irrelevant portions copied from the assigned template 906 (e.g., for events that have not been fired) can be removed from the processed template 908.

The event information populated in the processed template 908 can be augmented with other information in a data augmentation stage 920. In the data augmentation stage 920, event data or the processed template 908 itself can be enriched with data from augmentation sources 922. For instance, augmented context data can include user data, product information, promotions and offers, personalizations, and up to date user account data. Such augmentation can occur using data augmentation sources 922 that include APIs 924 or other data sources 926.

In some implementations, data augmentation occurs in response to matching an event identifier retrieved from the event store 912 to an event identifier in an augmentations section of the assigned template 906. The augmentations section can include a list of connections and plugins that can used by the card builder to augment the processed template 908 or to include, in the processed template 908, a directive to be later processed by the generative LLM AI engine 918 to enable a certain function or plugin. For instance, function calling and/or plug in sections of the assigned template 906 that match retrieved events can be copied into the processed template 908, to later enable function calling 928 and plugins 930 in the generative LLM AI engine 918. The card builder can also include, in the processed template 908, additional information for to-be-enabled augmentations, such as a link to a manifest file or other details.

Regarding APIs 924 and other data sources 926, the card builder can utilize connectors that can handle augmentation source invocation and message passing, and request/response handling and formatting. The connectors can provide augmentation source output to the card builder, and the card builder can include augmentation source output in the processed template 908.

In some cases, the card builder can use one or more AI indexers 932 to retrieve a list of keywords included in current event/context information. The card builder can perform various RAG (Retrieval Augmentation Generation) techniques 934 to retrieve information from different data sources 926 (e.g., knowledge bases), that match retrieved keywords, to obtain additional context that can be used to ground the generative LLM AI engine 918.

After the data augmentation stage 920, the CIX card 902 can be created from the processed template 908 in a contextualization and insights stage 940. The contextualization and insights stage 940 corresponds to the eleventh and twelfth stages described above with respect to FIGS. 4A-4B. During creation of the CIX card 902, the card builder can remove certain intermediate items that may not be of any interest to card consumers, such as information only used for invoking augmentation sources, default context strings to be used only in error situations, information used for sequencing items, etc. In some cases, the CIX card 902 is created as a copy of the processed template 908 and intermediate items can be removed after the CIX card 902 is created. In other implementations, information from an in-memory processed template 908 is copied to an empty CIX card 902 instance, to populate the CIX card 902.

Part of CIX card 902 creation includes generation of a context prompt to be used in a context window 942 of the generative LLM AI engine 918. For example, the card builder can generate the context prompt by combining event-enriched context strings and augmentation source output included in the processed template 908. The card builder can also generate or otherwise include a system prompt in the CIX card 902. In some implementations, the system prompt is included in the assigned template 906 and is carried over to the processed template 908 and eventually the CIX card 902. The system prompt can be included in the context window 942 to prompt the generative LLM AI engine with overview instructions. The system prompt can be kept separate from the context prompt to enable insight generation from the context prompt, by the card builder and/or by card consumers.

For instance, after the context string has been generated, the card builder can generate different types of insights 944. For example, an insights section of the assigned template 906 can include connectors and engineered prompts designed during prompt engineering and optimization 916 that can be used to invoke queries 946 against the context prompt regarding various organizational rules 948 with respect to compliance to procedures 950, authentication status, sentiment analysis, fraud activity, etc. The connectors in the insights section can be used to invoke the generative LLM AI engine 918, another AI engine, or some other data processor. Additionally, the generative LLM AI engine 918 can be invoked to generate a general summary of the context prompt, a greeting for an agent 952 to use in an assisted interaction leg with a user 954, etc. The card builder can add generated summaries, greetings, and insights to the CIX card 902. As described above, after the CIX card 902 is created, the CIX card 902 can be added to a card queue accessible by various card consumers.

The CIX card 902 can be provided to a card consumer, such as a channel application 962, in a card consumption stage 960. The card consumption stage 960 corresponds to the fourteenth, fifteenth, sixteenth, and seventeenth stages described above with respect to FIGS. 4A-4B. The channel application 962 can, for example, retrieve the CIX card 902 (and possibly one or more historical cards) when the agent 952 uses the channel application 962 to assist the user 954. The channel application 962 can interface with a generative LLM AI client 964 of the generative LLM AI engine 918.

For example, the channel application 962 can retrieve the context prompt and the system prompt from the CIX card 902 and provide the context prompt and the system prompt to the generative LLM AI client 964. The channel application 962 can also retrieve other prompts or instructions in the CIX card 902 that direct the generative LLM AI client 964 to enable different plugins for use by the generative LLM AI engine 918. When the channel application 962 has retrieved historical cards, the channel application can send a request to the generative LLM AI client 964 for the generative LLM AI engine 918 to summarize the current CIX card 902 and the historical cards and update its context with the summary. The channel application 962 can receive the historical card summary and add the summary to the CIX card 902. The channel application 962 can present the summary, a previously-generated greeting, and/or the CIX card 902 or portions of the CIX card 902.

The channel application 962 can enable the agent 952 to submit queries to and receive answers from the generative LLM AI engine 918. The generative LLM AI engine 918 can, with its context built from information in the CIX card 902, generate and provide answers to agent queries (to the channel application 962 via the generative LLM AI client 964). The channel application 962 can generate events, based on agent 952 and user 954 interaction, and/or based on agent 954/generative LLM AI engine 918 interaction. Generated events can be streamed to the event store 912 and eventually processed by the card builder to create an updated CIX card 902. Additionally or alternatively, events generated by the current interaction in the channel application 962 can be provided to the generative LLM AI client 964 in an active generative LLM AI session for a real-time update to the context being used by the generative LLM AI engine 918.

Figure 10:
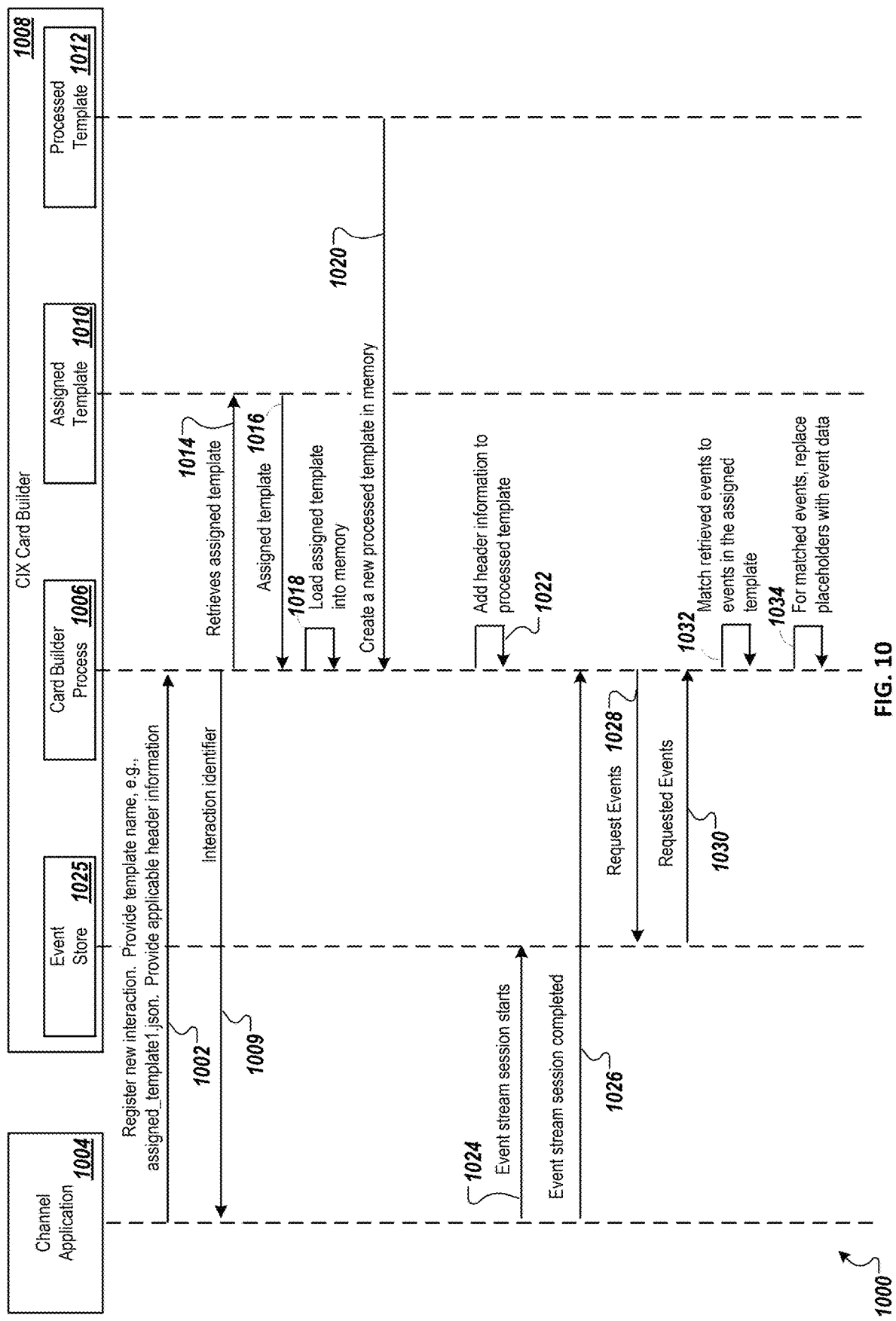
FIG. 10 is a swim lane diagram of an example process.

FIG. 10 is a swim lane diagram of an example process 1000. The example process 1000 corresponds to the first, second, third, and fourth stages described for FIGS. 4A-B and the process 600 of FIG. 6, using examples of assigned templates and processed templates as described above with respect to FIG. 9. As described above with respect to FIG. 6, at 1002, a channel application 1004 sends a registration message to a card builder process 1006 of a CIX card builder 1008. The registration message can include a template name (e.g., "assigned_template1.json") or another type of template identifier for an assigned template 1010 that has been assigned to a channel type of the channel application 1004. The registration message can also include header information which can be copied by the card builder process 1006 into a processed template 1012, as described below. At 1009, the card builder process provides an interaction identifier to the channel application 1004.

At 1014, the card builder process 1006 retrieves the assigned template 1010 (e.g., from a template store). At 1016, the card builder process 1006 receives a copy of the assigned template 1010. At 1018, the card builder process 1006 loads the copy of the assigned template 1010 into memory of the device that is executing the card builder process 1006. At 1020, the card builder process 1006 creates the processed template 1012 in memory of the device that is executing the card builder process 1006. At 1022, the card builder process 1006 adds header information to a header section of the processed template.

FIG. 11 illustrates an example header section 1100 of a card template (e.g., a processed template). The header section 1100 includes a template identifier 1102 that identifies the card template. A template version 1104 indicates a version of the card template. Modified date 1106 and creation date 1108 timestamps indicate when the template was last modified and created, respectively. An interaction identifier 1110 is populated in the processed template. The card builder can populate the interaction identifier 1110, for example. A builder identifier field 1112 can store an identifier of the card builder that processed the processed template.

A customer (e.g., user) identifier 1114 can store an identifier of a user of the interaction. The customer identifier 1114 can be initially empty while the user is unauthenticated but can be populated by the card builder with the customer identifier after the user is authenticated. A LOB identifier 1116 can store a LOB that is handling the interaction. A location information field 1118 can store location information obtained, for example, from a device or application session. A language field 1120 can store an indication of a language of the user.

A date-time field 1122 can store a start date and time of the interaction. A channel identifier 1124 can indicate a channel type (e.g., telephone, physical branch, ATM (Automatic Teller Machine), contact center, online chat, mobile banking, etc.). A media identifier 1126 can indicate a media type of the interaction (e.g., voice, text, video, etc.). Session information 1128 can include user session information, such as browser session data). Device information 1130 can include information regarding a user device (e.g., device type, operating system, etc.). An interaction handle 1132 can store an identifier for the user while the user is unauthenticated, such as a call-in phone number, an email address, etc.). A last update date 1134 can indicate when the process template or card was last updated.

Referring again to FIG. 10, at 1024, an event stream session starts in which the channel application 1004 streams events to an event store 1025 (e.g., as described above with respect to FIG. 6). At 1026, the channel application 1004 sends a notification to the card builder process 1006 that the event stream session has completed. At 1028, the card builder process 1006 requests events from the event store 1025 that have an interaction identifier matching the interaction identifier provided to the channel application 1004 during registration of the interaction by the channel application 1004. At 1030, the card builder process 1006 receives the requested events from the event store 1025.

At 1032, the card builder process 1006 matches, by event identifier, retrieved events to event sections in the assigned template 1010. If multiple retrieved events have a same event identifier, the card builder process 1006 can order events having a same event identifier by event sequence number information in the retrieved event information. That is, the event identifiers can represent event types and the sequence numbers can represent different instances of a same event type.

At 1034, the card builder process 1006 can, for matching events, replace placeholder values in event context strings with event data, as described above with respect to FIGS. 7A-7B. Updated context strings can be held in memory used by the card builder process 1006 until the card builder process is ready to populate the processed template 1012, as described below. If more than one event section in the assigned template 1010 matches a retrieved event identifier, each event section can be processed, in an order defined by process order numbering in the event sections. Retrieved event identifiers can also be matched to augmentation sections of the assigned template 1010, as described below.

Figure 12:
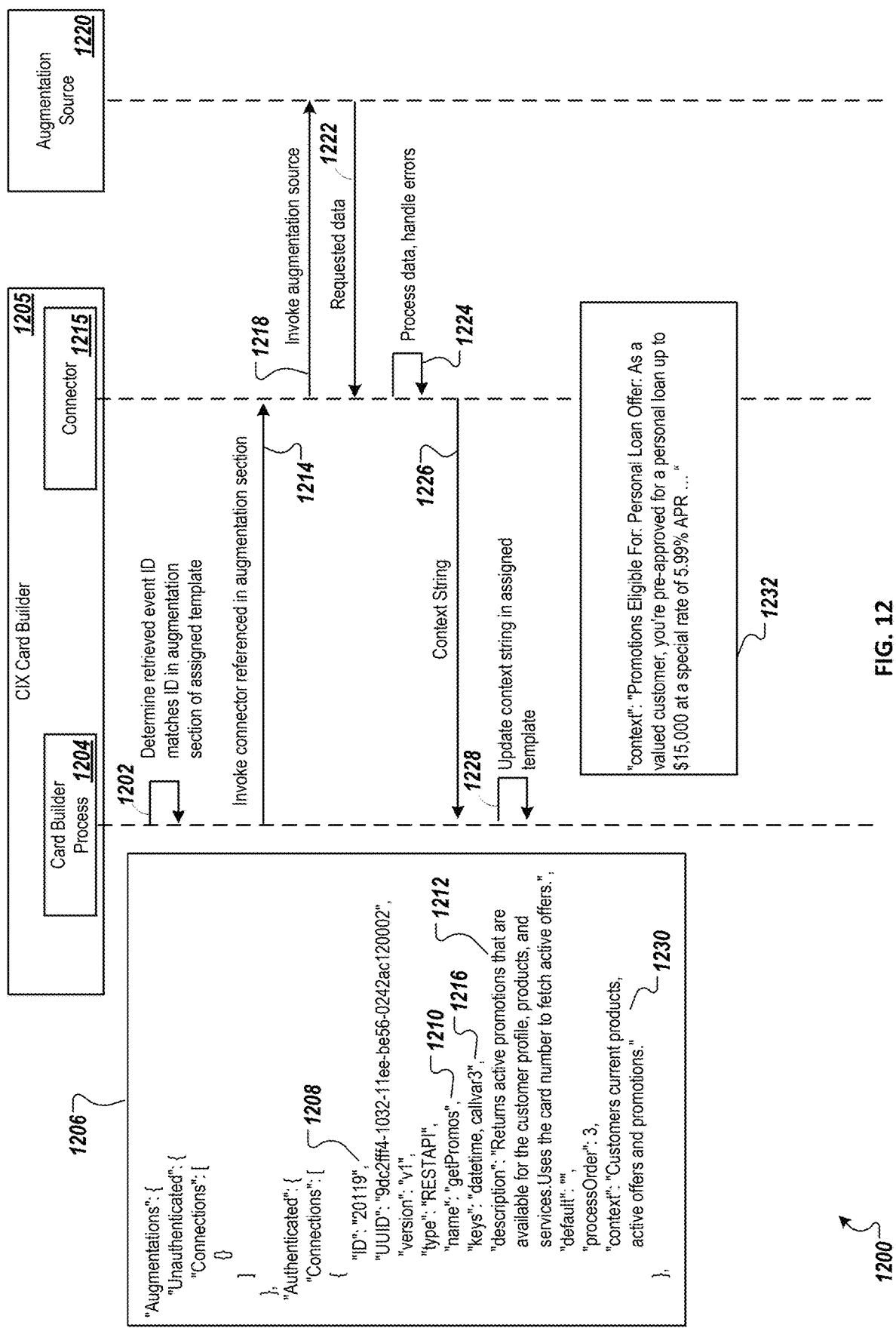
FIGS. 12-13 are swim lane diagrams of example processes.

FIG. 12 is a swim lane diagram of an example process 1200. The process 1200 can be a continuation of the process 1000 described above with respect to FIG. 10. The process 1200 corresponds to the eighth, ninth, and tenth stages described above for FIGS. 4A-B.

At 1202, a card builder process 1204 of a CIX card builder 1205 can determine that an event identifier of an event retrieved from an event store matches an event identifier in an augmentation section in an assigned template (e.g., the assigned template 1010). For instance, an example augmentations section 1206 is shown. As an example, the card builder process 1204 can determine that an event identifier of a retrieved event matches an event identifier 1208 of an API 1210 in a connections sub-section of the augmentations section 1206. As indicated by an API description 1212, the API 1210 can return information regarding active promotions.

At 1214, the card builder process 1204 can use the information in the augmentation section 1206 to send a request to a connector 1215 associated with the API 1210 requesting the connector to invoke the API 1210. The card builder process 1204 can reference a keys object 1216 that indicates which event data can be included in the request to the connector as inputs for the API 1210. For example, the keys object 1216 indicates that "datetime" and "callvar3" items can be provided as inputs to the API 1210. The card builder process 1204 can retrieve event data from the retrieved event corresponding to the "datetime" and "callvar3" items and include the retrieved event information in the request sent to the connector 1215. In some examples, a "datetime" item (or perhaps a "$datetime" item prefixed with a special "$" character) can be processed by the card builder process 1204 and replaced, for example, with a current date and time. That is, date/time items can, in some cases, represent a date of processing, and in other cases, can be event-specific information indicating a date/time of the event itself.

At 1218, the connector 1215 invokes an augmentation source 1220 specified in the augmentation section. For example, the connector 1215 can invoke the API 1210. The connector 1215 can include inputs received from the card builder process 1204 when invoking the augmentation source 1220. At 1222, the connector 1215 receives output data from the augmentation source 1220 (e.g., output data generated from processing of the API 1210). At 1224, the connector 1215 processes the data received from the augmentation source 1220. For example, in some cases, the connector 1215 may reformat data received from the augmentation source 1220. As another example, the connector 1215 can perform error handling if the output from the augmentation source 1220 indicates an error condition. If an error has not occurred, the connector 1215 can include the output from the augmentation source in a context string. At 1226, the connector 1215 can return the context string to the card builder process 1204. At 1228, the card builder process 1204 can, for example, update a context string associated with the augmentation source in the assigned template. As another example, the card builder process 1204 can copy the context string received from the connector to a processed template (e.g., the processed template 1012). As an example, for the API 1210, the card builder process 1204 can update a default context string 1230 with a received context string 1232 that describes active promotions that are available for the user.

Figure 13:
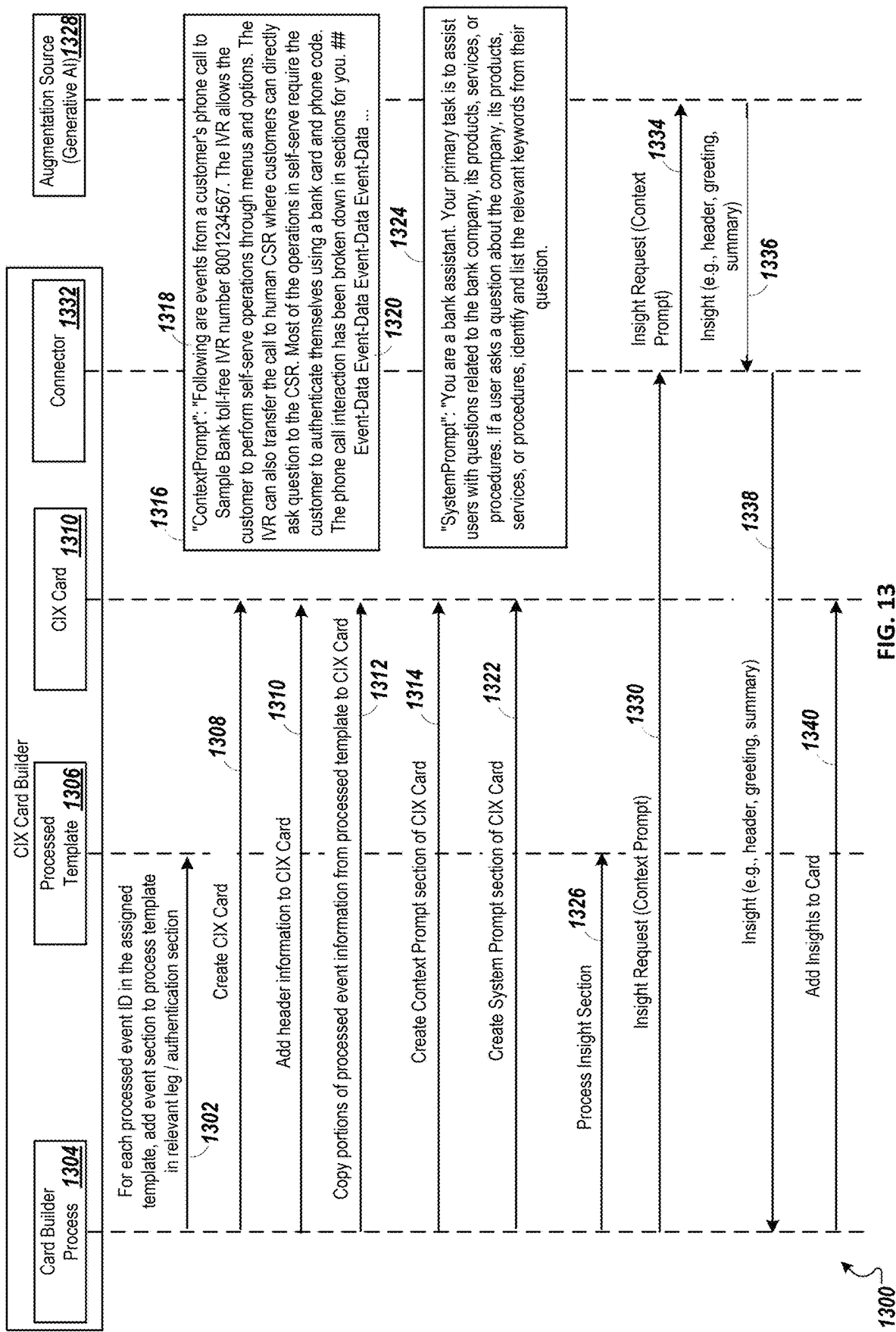

FIG. 13 is a swim lane diagram of an example process 1300. The process 1300 can be a continuation of the process 1200 described above with respect to FIG. 12. The process 1300 corresponds to the eleventh and twelfth stages described above for FIGS. 4A-B.

At 1302, a card builder process 1304 (which can be the card builder process 1204) adds an event section to a processed template 1306 (which can be the processed template 1012 described above with respect to FIG. 10), for each event identifier processed during the process 1000 or the process 1200, in a relevant interaction leg and authentication section of the processed template 1306. The event section added to the processed template 1306 can include event information that has been enriched with context from the assigned template 1010 and/or with API output received from the augmentation source 1220 received via the connector 1215.

At 1308, the card builder process 1304 creates a CIX card 1310 (e.g., in memory or on disk of the device that is executing the card builder process 1304). At 1310, the card builder process 1304 adds header information to the CIX card 1310. For example, the card builder process 1304 can copy header information (which may be from the header section 1100 described above with respect to FIG. 11) from the processed template 1306 to the CIX card 1310. At 1312, the card builder process 1304 copies processed event information from the processed template 1306 to the CIX card 1310. Although data can be copied from the processed template 1306 to the CIX card 1310 after the CIX card 1310 is created, other approaches can be used, such as the card builder process 1304 creating the CIX card 1310 as a copy of the processed template 1306 (and then possibly removing information from the CIX card 1310 that had been copied from the processed template 1306 and leaving in the CIX card 1310 other information copied from the processed template 1306).

At 1314, the card builder process 1304 creates a context prompt section of the CIX card 1310. As described above, the context prompt can be used to establish context for a generative LLM AI engine (e.g., the generative LLM AI engine 130, 410, 496, or 918).

An example context prompt 1316 is shown. The example context prompt 1316 includes an introductory section 1318 that includes details of the interaction and an event data list 1320. Each item in the event data list 1320 can be an enriched context string, such as the context string in the updated event structure 758 described above with respect to FIG. 7B, or a context string received by a connector in response to invocation of an augmentation source, such as the received context string 1232 described above with respect to FIG. 12.

At 1322, the card builder process 1304 creates a system prompt section of the CIX card 1310. As described above, the system prompt can be used as an overview prompt for the generative LLM AI engine (e.g., the generative LLM AI engine 130, 410, 496, or 918). An example system prompt 1324 is shown. The example system prompt 1324 indicates to the generative LLM AI engine a role and primary task of the generative LLM AI engine.

At 1326, the card builder process 1304 processes an insights section of the processed template 1306 (or in some cases, an insights section of the corresponding assigned template 1010 or the CIX card 1310 itself). Insights can be generated based on the context prompt, for example. Insights can be generated by one or more augmentation sources. For example, insights can be generated by an augmentation source 1328 (which can be the generative LLM AI engine 130, 410, 496, or 918, another AI engine, or another type of augmentation source).

For each insight entry in the insights section, the card builder process 1304 can, at 1330, send the context prompt in an insight request to a connector 1332 associated with an augmentation source included in the insight entry. At 1334, the connector 1332 can send a request and the context prompt to the respective augmentation source 1328 and manage formatting of the request and any connectivity details. At 1336, the connector 1332 receives an insight from the augmentation source 1328. At 1338, the connector 1332 provides the insight to the card builder process 1304 (e.g., after possible formatting of information received from the augmentation source 1328). Insights can be headers, greetings, summaries, or other types of insights, as described below with respect to FIG. 14. At 1340, the card builder process 1304 adds received insights to the CIX card 1310.

FIG. 14 illustrates an example insights section 1400 of a card template. The card template can be the processed template 1306 described above with respect to FIG. 13, for example. The card builder process 1304 can process each of various example insight entries included in the example insights section (e.g. as part of executing the process 1300). The example insight entries in the insights section 1400 each relate to an insight request for text analysis of a completed context prompt, with the analysis being performed by a generative LLM AI engine (e.g., the generative LLM AI engine 130, 410, 496, or 918, or another engine). For example, a heading insight request 1402 can be processed by the generative LLM AI engine in response to a request sent by a connector that is invoked by the card builder process. The connector can manage connectivity and handling of requests and responses to and from the generative LLM AI engine. The connector is identified by a connection setting 1403, which can refer to a connector defined elsewhere in the card template in a connectors section (not shown).

The insight entry for the heading insight request 1402 specifies that input 1404 for the insight processing is "$ContextPrompt", which represents a context prompt generated by the card builder process.

In general, the "$" character can represent a card builder variable that the card builder process can replace with a corresponding variable value. For the $ContextPrompt variable, the card builder process can replace the $ContextPrompt variable with the full context prompt and the card builder process can provide the full context prompt to the connector, along with an insight generation prompt 1406. The connector can forward the context prompt and the insight generation prompt 1406 to the generative LLM AI engine. The insight generation prompt 1406 prompts the generative LLM AI engine to generate a heading to summarize the interaction (e.g., described in the context prompt) from a customer's perspective. The insight entry for the heading insight request 1402 includes a parameter profile identifier 1408. The parameter profile identifier 1408 refers to a parameter profile 1410 included in a completion profiles section 1412 of the card template. The parameter profile 1410 includes various parameter/parameter value pairs that can be forwarded on to the generative LLM AI engine and used by the generative LLM AI engine when generating the heading insight.

The insights section includes other insight entries defining other insight requests. For example, a greeting insight request 1414 can be sent with the context prompt to the generative LLM AI engine along with an insight generation prompt 1416 that prompts the generative LLM AI engine to generate a greeting that a CSR can use to greet the user. As another example, a sentiments insight request 1418 can be sent with the context prompt to the generative LLM AI engine along with an insight generation prompt 1420 that prompts the generative LLM AI engine to generate a sentiment analysis report of the interaction. As yet another example, a summary insight request 1422 can be sent with the context prompt to the generative LLM AI engine along with an insight generation prompt 1424 that prompts the generative LLM AI engine to generate a summary of the interaction that is around three hundred words or less.

Figure 15:
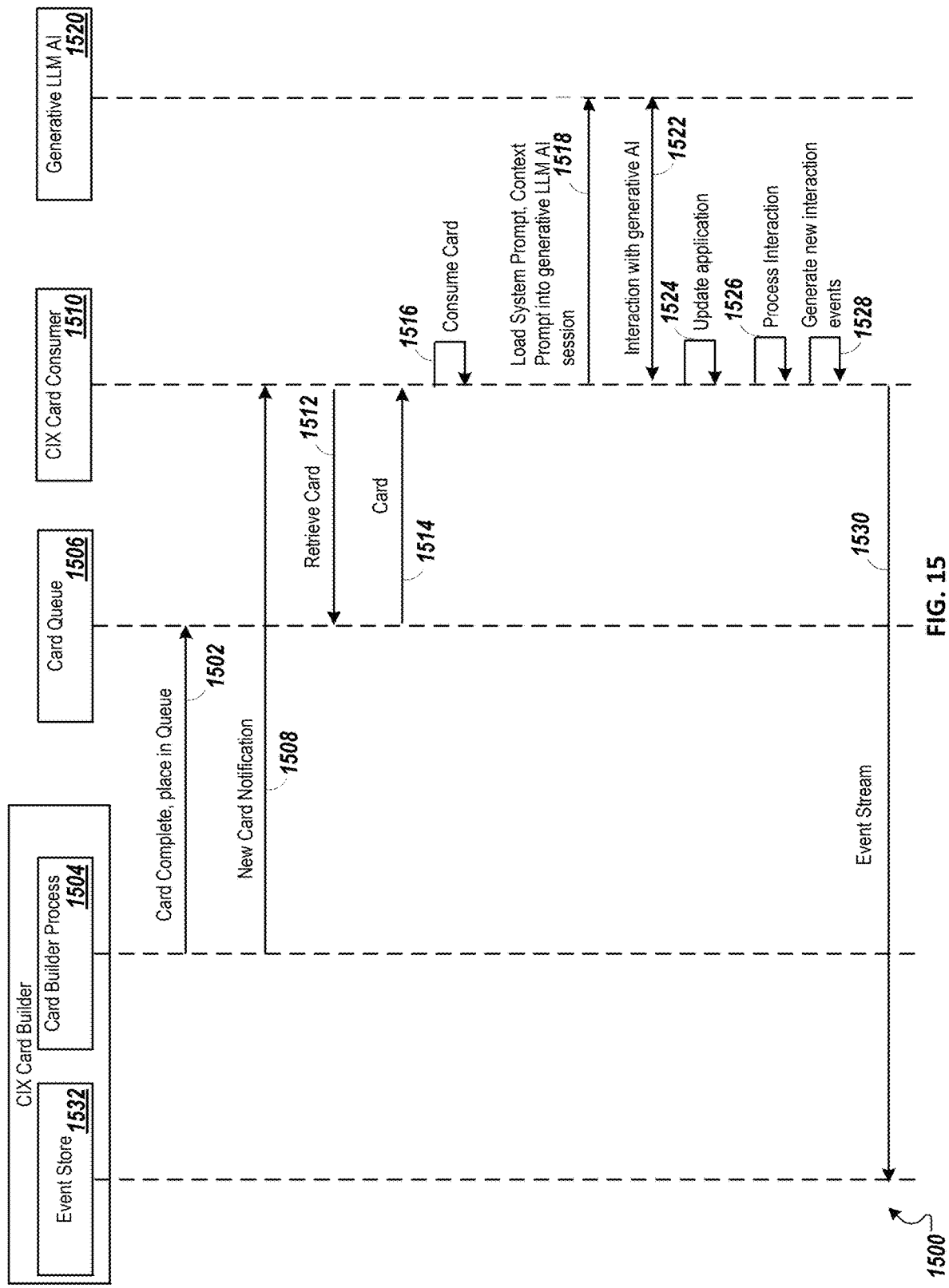
FIG. 15 is a swim lane diagram of an example process.

FIG. 15 is a swim lane diagram of an example process 1500. The process 1500 can be a continuation of the process 1300 described above with respect to FIG. 13. The process 1500 corresponds to the thirteenth, fourteenth, fifteenth, sixteenth, and seventeenth stages described above for FIGS. 4A-B.

At 1502, a card builder process 1504 (which can be the card builder process 1304) determines that a CIX card (e.g., the CIX card 1310) is complete and places the CIX card in a card queue 1506. At 1508, in some implementations, the card builder process 1504 sends a new card notification to a CIX card consumer 1510 (which can be, for example, an assisted channel application). In other implementations, the CIX card consumer 1510 can poll the card queue 1506 to determine that the card queue 1506 has a new CIX card related to a current interaction. At 1512, the CIX card consumer 1510 sends a request to the card queue 1506 to retrieve a CIX card for the interaction. At 1514, the CIX card consumer 1510 receives the CIX card from the card queue 1506. Various approaches can be used to provide the CIX card to the CIX card consumer 1510. For example, the CIX card can be sent to the CIX card consumer 1510 as a response via a HTTP (HyperText Transfer Protocol) REST (REpresentational State Transfer) API, Webhook, or other methods. The CIX card can be encoded using secure JSON (JavaScript Object Notation) web tokens for added security.

At 1516, the CIX card consumer 1510 loads the card and begins consumption (e.g., processing) of the CIX card. For example, at 1518, the CIX card consumer 1510 can extract a system prompt and context prompt from the CIX card and provide the system prompt and the context prompt to a generative LLM AI engine 1520 (which can be the generative LLM AI engine 130, 410, 496, or 918).

At 1522, the CIX card consumer 1510 can interact with the generative LLM AI engine 1520. For example, the CIX card consumer 1510 can, in response to receiving a user input representing an agent question for the generative LLM AI engine 1520, provide the question to the generative LLM AI engine 1520. The generative LLM AI engine 1520, with its context established based on the context prompt and system prompt previously received from the CIX card consumer 1510, can formulate an answer to the question and provide the answer to the CIX card consumer 1510. At 1524, the CIX card consumer 1510 can update itself in response to information received from the generative LLM AI engine 1520. For example, the CIX card consumer 1510 can update an application user interface to display the answer to the agent. At 1526, the agent can use the CIX card consumer (e.g., the application) to process the interaction (e.g., to respond to the user, provide information to the user, interact with one or more backend systems to update a user account, etc.). At 1528, the CIX card consumer 1510 can act as an event generator by capturing events performed in the CIX card consumer 1510, including interactions with the generative LLM AI engine 1520. At 1530, the CIX card consumer 1510 can stream captured/generated events to an event store 1532. The events streamed at 1530 can be used by the card builder process to update the CIX card. The CIX card consumer 1510 can also dynamically send events to the generative LLM AI engine 1520 so that the generative LLM AI engine 1520 can dynamically update its context with CIX card consumer 1510 generated events as well as with query-response information the generative LLM AI engine 1520 has generated for the CIX card consumer 1510.

Figure 16:
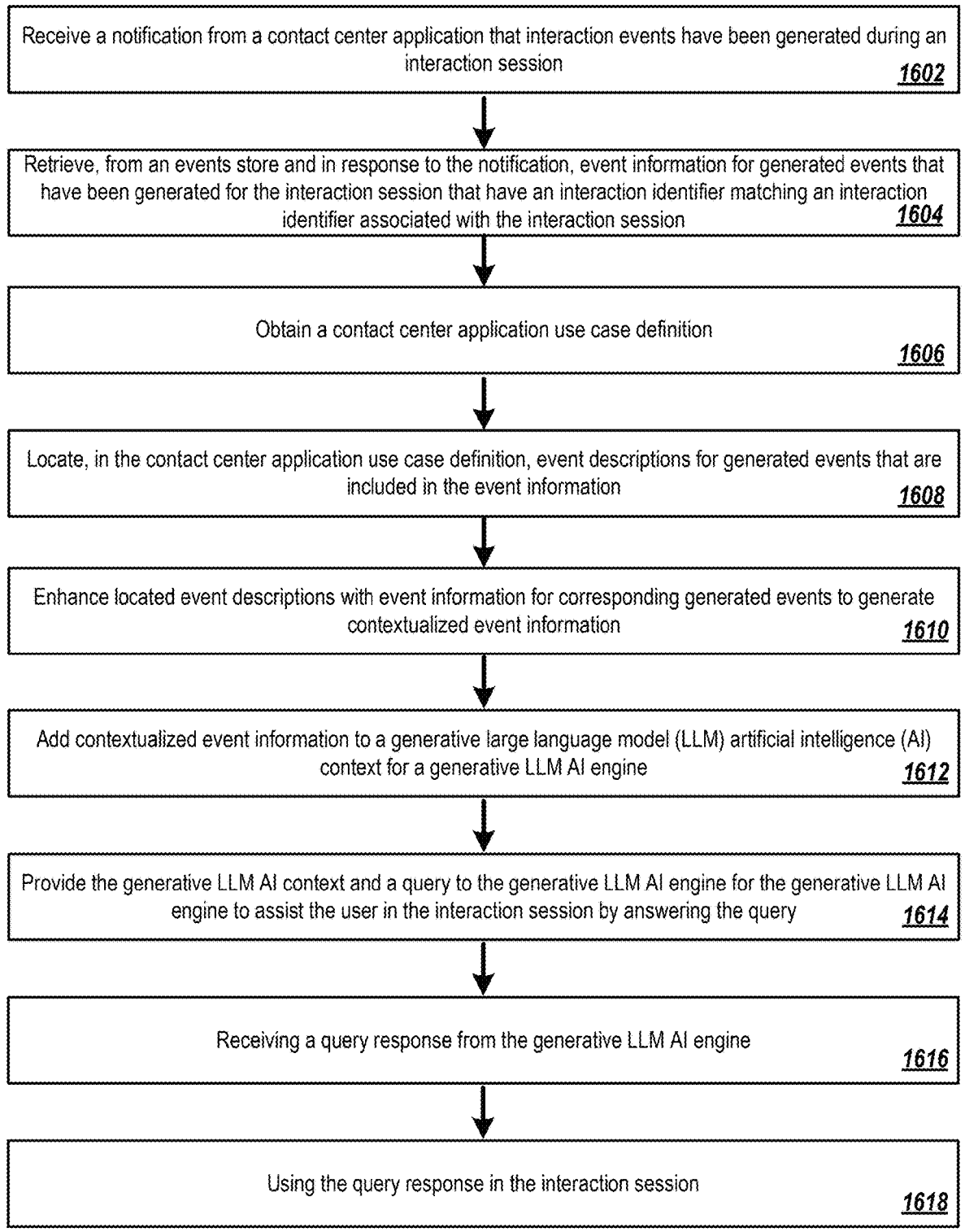
FIGS. 16-17 are flow diagrams of example methods for using generative artificial intelligence to improve user interactions.

FIG. 16 is a flow diagram of an example method 1600 for using generative artificial intelligence to improve user interactions. It should be understood that method 1600 can be performed, for example, by any suitable system, environment, software, and hardware, or a combination of systems, environments, software, and hardware as appropriate. In some instances, method 1600 can be performed by a system including one or more components of the system 400, such as the card builder 406, as well as other components or functionality described in other portions of this description. Any suitable system(s), architecture(s), or application(s) can be used to perform the illustrated operations.

At 1602 (as further described for the third stage with respect to FIG. 4A), a notification is received from a contact center application indicating that interaction events have been generated for an interaction session of a user with the contact center application. The notification can indicate a start of an agent-assisted interaction leg of the interaction session.

At 1604 (as further described for the fourth stage with respect to FIG. 4A and the events store 414), event information for generated events that have been generated for the interaction session that have an interaction identifier matching an interaction identifier associated with the interaction session are retrieved from an events store in response to the notification. The generated events can be events generated in a voice response system, a chat application, a mobile application, or a web application, for example.

At 1606 (as described above for the fifth stage of FIG. 4A and the card template 408), a contact center application use case definition is obtained. The contact center application use case definition includes event descriptions of events that can occur during user interactions with the contact center application during the use case. The contact center application use case can be, for example, an assigned template.

At 1608 (as described above for the sixth stage with respect to FIG. 4A), event descriptions for generated events that are included in the event information are located in the contact center application use case definition.

At 1610 (as described above for the seventh stage with respect to FIG. 4A), located event descriptions are enhanced with event information for corresponding generated events to generate contextualized event information. Enhancing located event descriptions with event information can include, for a first generated event and a first event description: determining that the first event description includes an event data placeholder that comprises an event data key; locating, in the first generated event, a key-value pair that has a key matching the event data key in the event data placeholder; extracting a value for the key from the key-value pair; and replacing, in the first event description, the event data placeholder with the value for the key.

At 1612 (as described above for the eleventh stage with respect to FIG. 4A), the contextualized event information is added to a generative large language model (LLM) artificial intelligence (AI) context for a generative LLM AI engine. The context can be stored in a card (e.g., a CIX card).

The contact center application use case definition can also include API information for APIs that can be invoked to generate further contextual information to include in the generative AI context. The card builder can locate, in the contact center application use case definition, a first API definition, for a first API, that has a same event identifier as a first generated event. The card builder (or a connector acting on behalf of the card builder) can invoke the first API (and can include event information as input(s) to the API) and receive API output from the first API. The card builder can include the API output in the generative LLM AI context.

The contact center application use case definition can include plug-in information for at least one generative LLM AI model plug-in. The card builder can include the plug-in information in the generative LLM AI context to instruct the generative LLM AI engine to enable the at least one generative LLM AI model plug-in during the interaction session.

At 1614 (as described above with respect to, the generative LLM AI context is provided to the generative LLM AI engine for the generative LLM AI engine to assist the user in the interaction session. The generative LLM AI engine can use the generative AI context to assist a contact center agent in the assisted interaction leg of the interaction session. The generative LLM AI engine can use various plug-ins that have been enabled for use in the engine.

At 1616 (as described above for the sixteenth stage with respect to FIG. 4A), a query response is received from the generative LLM AI engine.

At 1618 (as described above for the sixteenth stage with respect to FIG. 4A), the query response is used in the interaction session.

In some implementations, the contextualized event information and an insight prompt provided to the generative LLM AI engine, where the insight prompt prompts the generative LLM AI engine to generate an insight from the contextualized event information. The insight can be received from the generative LLM AI engine and added to the generative LLM AI context. The insight can indicate, for example, whether the contextualized event information adheres to one or more organizational policies or whether fraud has occurred in the interaction session. As another example, the insight can be a human-readable greeting that can be spoken by a contact center agent to the user as a summary of the interaction session.

Figure 17:
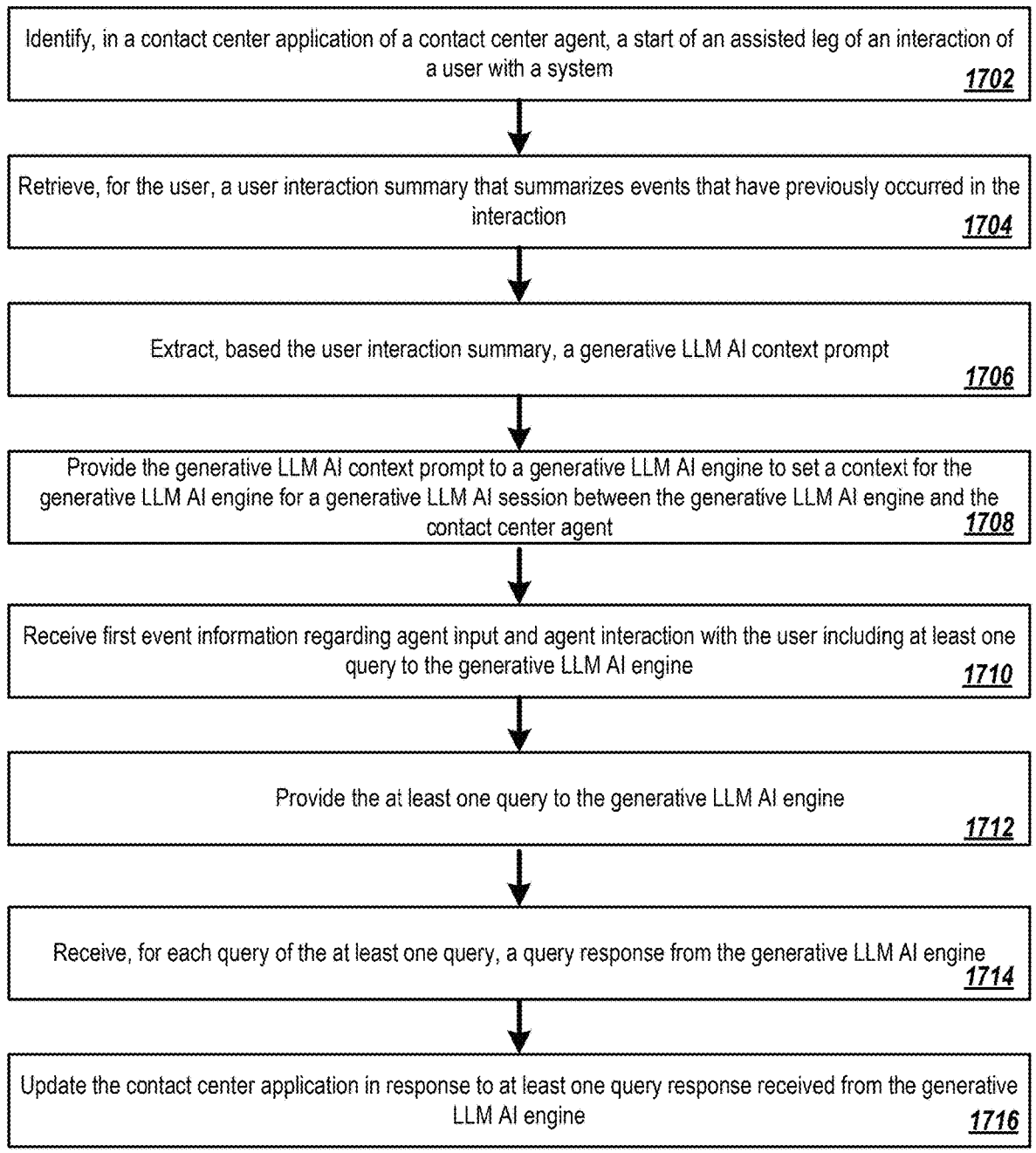

FIG. 17 is a flow diagram of an example method 1700 for using generative artificial intelligence to improve user interactions. It should be understood that method 1700 can be performed, for example, by any suitable system, environment, software, and hardware, or a combination of systems, environments, software, and hardware as appropriate. In some instances, method 1700 can be performed by a system including one or more components of the system 400, such as the assisted channel application 420, as well as other components or functionality described in other portions of this description. Any suitable system(s), architecture(s), or application(s) can be used to perform the illustrated operations.

At 1702 (as described above for step 1508 of FIG. 15), a start of an assisted leg of an interaction of a user with a system is identified in a contact center application of a contact center agent.

At 1704 (as described above for step 1512 of FIG. 15), a user interaction summary is retrieved for the user that summarizes events that have previously occurred in the interaction. The user interaction summary can be or be included in the CIX card 418 described above with respect to FIGS. 4A-4B. The events that have previously occurred in the interaction may have occurred during a self-serve leg of the interaction in which the user interacts with the system without assistance of an agent. The assisted leg of the interaction may have started in response to a transfer to the contact center agent during the self-serve leg of the interaction. At least part of the user interaction summary can be displayed in the contact center application. A generative LLM AI generated greeting previously generated by a generative LLM AI engine can be retrieved from the user interaction summary and displayed in the contact center application.

At 1706 (as described above for step 1516 of FIG. 15), a generative LLM AI context prompt is extracted based on the user interaction summary. The generative LLM AI context prompt can include enriched event data for the events that have previously occurred in the interaction. The enriched event data can include contact center application event data generated by a contact center application used by the user that is merged with event context prompts that provide semantic descriptions of the contact center application event data. As another example, the enriched event data can include the contact center application event data that is merged with function output obtained by invoking at least one function of the system, such as an API provided by the system, with contact center application event data as input.

At 1708 (as described above for step 1518 of FIG. 15), the generative LLM AI context prompt is provided to a generative LLM AI engine to set a context for the generative LLM AI engine for a generative LLM AI session between the generative LLM AI engine and the contact center agent. In some implementations, the context prompt is provided to the generative LLM AI engine along with an insight prompt that prompts the generative LLM AI engine to generate an insight from the generative LLM AI context prompt. The insight generated from the generative LLM AI context prompt can be received from the generative LLM AI engine. The generative LLM AI engine can be prompted to update the context of the generative LLM AI engine using the insight. The insight can also be displayed in the contact center application.

At 1710 (as described above for step 1522 of FIG. 15), first event information is received regarding agent input and agent interaction with the user. The first event information includes at least one query to the generative LLM AI engine. In some cases, second event information regarding agent interaction with the user can received that corresponds to events resulting from a query response received from the generative LLM AI engine. For example, the second event information can describe the contact center agent providing at least some information in the query response received from the generative LLM AI engine to the user. The generative LLM AI engine can be prompted to update the context of the generative LLM AI engine with the first event information and the second event information. In some cases, the contact center application includes a first user interface portion that displays user-agent interaction information and a second user interface portion that displays agent-generative LLM AI engine interaction information.

At 1712 (as described above for step 1522 of FIG. 15), the at least one query is provided to the generative LLM AI engine.

At 1714 (as described above for step 1522 of FIG. 15), a query response is received from the generative LLM AI engine for each query of the at least one query.

At 1716 (as described above for step 1524 of FIG. 15), the contact center application is updated in response to at least one query response received from the generative LLM AI engine.

In some implementations, a user identifier is determined from the user interaction summary. The user identifier can be used to retrieve historical user interaction summaries of previous interactions of the user with the system. The generative LLM AI engine can be prompted to generate an overall summary of interactions of the user with the system based on the user interaction summary and the historical user interaction summaries. The overall summary from the generative LLM AI engine and displayed in the contact center application. The generative LLM AI engine can also be prompted to update the context of the generative LLM AI engine using the overall summary.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, during a current interaction session of a user with a contact center application, a notification from the contact center application that user interaction events have been generated based on user interaction with the contact center application;
   retrieving, during the current interaction session, from an events store and in response to the notification, event information for generated events that have been generated based on user interaction with the contact center application during the current interaction session that have an interaction identifier matching an interaction identifier associated with the current interaction session, wherein event information for a first event lacks semantic meaning for establishing a generative large language model (LLM) artificial intelligence (AI) context for a generative LLM AI engine;
   obtaining a contact center application use case definition, from among a plurality of use case definitions for different application types, that includes event descriptions of events that can occur during user interactions with an application type of the contact center application during the use case, wherein the event descriptions include semantic information for the first event for establishing the generative LLM AI context for the generative LLM AI engine;
   parsing the contact center application use case definition to locate event descriptions that have a same event identifier as generated events that are included in the event information;
   enhancing, during the current interaction session, located event descriptions with event information for corresponding generated events to generate contextualized event information that includes semantic information for the first event for establishing the generative LLM AI context for the generative LLM AI engine;
   configuring, during the current interaction session, the generative LLM AI engine by using the contextualized event information as a generative LLM AI context to ground the generative LLM AI engine for the current interaction session;
   providing a query to the grounded generative LLM AI engine for the grounded generative LLM AI engine to provide assistance in the current interaction session by answering the query;
   receiving a query response from the grounded generative LLM AI engine; and
   using the query response in the current interaction session.

2. The computer-implemented method of claim 1, wherein the notification indicates a start of an agent-assisted interaction leg of the current interaction session.

3. The computer-implemented method of claim 2, wherein the generative LLM AI engine uses the generative AI context to assist a contact center agent in the assisted interaction leg of the current interaction session.

4. The computer-implemented method of claim 1, wherein the contact center application use case definition includes application programming interface (API) information for APIs that can be invoked to generate further contextual information to include in the generative AI context.

5. The computer-implemented method of claim 4, further comprising:
   locating, in the contact center application use case definition, a first API definition, for a first API that has a same event identifier as a first generated event;
   invoking the first API;
   receiving API output from the first API; and
   including the API output in the generative LLM AI context.

6. The computer-implemented method of claim 5, wherein invoking the first API includes providing event information for the first generated event to the first API.

7. The computer-implemented method of claim 1, wherein the contact center application use case definition includes plug-in information for at least one generative LLM AI model plug-in; and wherein the method further comprises including the plug-in information in the generative LLM AI context to instruct the generative LLM AI engine to enable the at least one generative LLM AI model plug-in during the current interaction session.

8. The computer-implemented method of claim 1, wherein enhancing located event descriptions with event information comprises, for a first generated event and a first event description:
- determining that the first event description includes an event data placeholder that comprises an event data key;
- locating, in the first generated event, a key-value pair that has a key matching the event data key in the event data placeholder;
- extracting a value corresponding to the key in the key-value pair; and
- replacing, in the first event description, the event data placeholder with the value corresponding to the key.

9. The computer-implemented method of claim 1, wherein the contact center application comprises a voice response system, a chat application, a mobile application, or a web application.

10. The computer-implemented method of claim 1, further comprising:
- providing the contextualized event information to the generative LLM AI engine and an insight prompt that prompts the generative LLM AI engine to generate an insight from the contextualized event information;
- receiving, from the generative LLM AI engine, the generated insight; and
- adding the insight to the generative LLM AI context.

11. The computer-implemented method of claim 10, wherein the insight indicates whether the contextualized event information adheres to one or more organizational policies.

12. The computer-implemented method of claim 10, wherein the insight indicates whether the contextualized event information indicates fraud has occurred in the current interaction session.

13. The computer-implemented method of claim 10, wherein the insight comprises a human-readable greeting that can be spoken by a contact center agent to the user as a summary of the current interaction session.

14. The computer-implemented method of claim 1, further comprising:
- generating keywords from the contextualized event information;
- providing the keywords in a request to at least one data source for keyword-based resources;
- receiving at least one keyword-based resource from a data source that provides information related to at least one generated keyword; and
- including information from or a link to the at least one keyword-based resource in the generative LLM AI context.

15. The computer-implemented method of claim 1, further comprising, before receiving the notification:
- receiving an indication from the contact center application that the current interaction session has begun, wherein the indication includes an identifier of the contact center application use case;
- generating, in response to the indication, an interaction identifier for the current interaction session of the user with the contact center application; and
- providing the interaction identifier to the contact center application in response to the indication.

16. A system comprising:
- at least one memory storing instructions;
- a network interface; and
- at least one hardware processor interoperably coupled with the network interface and the at least one memory, wherein execution of the instructions by the at least one hardware processor causes performance of operations comprising:
  - receiving, during a current interaction session of a user with a contact center application, a notification from the contact center application that user interaction events have been generated based on user interaction with the contact center application;
  - retrieving, during the current interaction session, from an events store and in response to the notification, event information for generated events that have been generated based on user interaction with the contact center application during the current interaction session that have an interaction identifier matching an interaction identifier associated with the current interaction session, wherein event information for a first event lacks semantic meaning for establishing a generative large language model (LLM) artificial intelligence (AI) context for a generative LLM AI engine;
  - obtaining a contact center application use case definition, from among a plurality of use case definitions for different application types, that includes event descriptions of events that can occur during user interactions with an application type of the contact center application during the use case, wherein the event descriptions include semantic information for the first event for establishing the generative LLM AI context for the generative LLM AI engine;
  - parsing the contact center application use case definition to locate event descriptions that have a same event identifier as generated events that are included in the event information;
  - enhancing, during the current interaction session, located event descriptions with event information for corresponding generated events to generate contextualized event information that includes semantic information for the first event for establishing the generative LLM AI context for the generative LLM AI engine;
  - configuring, during the current interaction session, the generative LLM AI engine by using the contextualized event information as a generative LLM AI context to ground the generative LLM AI engine for the current interaction session;
  - providing a query to the grounded generative LLM AI engine for the grounded generative LLM AI engine to provide assistance in the current interaction session by answering the query;
  - receiving a query response from the grounded generative LLM AI engine; and using the query response in the current interaction session; and
  - using the query response in the current interaction session.

17. The system of claim 16, wherein the notification indicates a start of an agent-assisted interaction leg of the current interaction session.

18. The system of claim 17, wherein the generative LLM AI engine uses the generative AI context to assist a contact center agent in the assisted interaction leg of the current interaction session.

19. A non-transitory, computer-readable medium storing computer-readable instructions, that upon execution by at least one hardware processor, cause performance of operations, comprising:
- receiving, during a current interaction session of a user with a contact center application, a notification from the contact center application that user interaction events have been generated based on user interaction with the contact center application;
- retrieving, during the current interaction session, from an events store and in response to the notification, event information for generated events that have been generated based on user interaction with the contact center application during the current interaction session that have an interaction identifier matching an interaction identifier associated with the current interaction session, wherein event information for a first event lacks semantic meaning for establishing a generative large language model (LLM) artificial intelligence (AI) context for a generative LLM AI engine;
- obtaining a contact center application use case definition, from among a plurality of use case definitions for different application types, that includes event descriptions of events that can occur during user interactions with an application type of the contact center application during the use case, wherein the event descriptions include semantic information for the first event for establishing the generative LLM AI context for the generative LLM AI engine;
- parsing the contact center application use case definition to locate event descriptions that have a same event identifier as generated events that are included in the event information;
- enhancing, during the current interaction session, located event descriptions with event information for corresponding generated events to generate contextualized event information that includes semantic information for the first event for establishing the generative LLM AI context for the generative LLM AI engine;
- configuring, during the current interaction session, the generative LLM AI engine by using the contextualized event information as a generative LLM AI context to ground the generative LLM AI engine for the current interaction session;
- providing a query to the grounded generative LLM AI engine for the grounded generative LLM AI engine to provide assistance in the current interaction session by answering the query;
- receiving a query response from the grounded generative LLM AI engine; and
- using the query response in the current interaction session.

20. The computer-readable medium of claim 19, wherein the notification indicates a start of an agent-assisted interaction leg of the current interaction session.

* * * * *